(12) United States Patent
Kim et al.

(10) Patent No.: US 12,141,376 B2
(45) Date of Patent: Nov. 12, 2024

(54) DISPLAY CONTROL SYSTEM USING KNOBS

(71) Applicant: HYUNDAI MOBIS Co., Ltd., Seoul (KR)

(72) Inventors: Kyung Hoon Kim, Yongin-si (KR); Tae Hun Kim, Seongnam-si (KR); Seung Hwan Lee, Hwaseong-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 17/858,314

(22) Filed: Jul. 6, 2022

(65) Prior Publication Data

US 2023/0009427 A1 Jan. 12, 2023

(30) Foreign Application Priority Data

Jul. 8, 2021 (KR) .......................... 10-2021-0089839
Jul. 8, 2021 (KR) .......................... 10-2021-0089840

(51) Int. Cl.
| | |
|---|---|
| *G06F 3/0362* | (2013.01) |
| *B60K 35/00* | (2006.01) |
| *G06F 3/04842* | (2022.01) |
| *G06F 3/04847* | (2022.01) |
| *G06F 3/04886* | (2022.01) |
| *G06F 9/451* | (2018.01) |
| *B60K 35/10* | (2024.01) |
| *B60K 35/22* | (2024.01) |
| *B60K 35/81* | (2024.01) |

(52) U.S. Cl.
CPC ............ *G06F 3/0362* (2013.01); *B60K 35/00* (2013.01); *G06F 3/04842* (2013.01); *G06F 3/04847* (2013.01); *G06F 3/04886* (2013.01); *G06F 9/451* (2018.02); *B60K 35/10* (2024.01); *B60K 35/22* (2024.01); *B60K 35/81* (2024.01); *B60K 2360/11* (2024.01); *B60K 2360/126* (2024.01); *B60K 2360/1438* (2024.01); *B60K 2360/1526* (2024.01); *B60K 2360/344* (2024.01); *G06F 2203/04803* (2013.01)

(58) Field of Classification Search
CPC .............. G06F 3/0362; G06F 3/04842; G06F 3/04847; G06F 3/04886; G06F 9/451; G06F 2203/04803; G06F 3/016; G06F 3/0346; G06F 3/0393; B60K 35/00; B60K 2370/11; B60K 2370/126; B60K 2370/1438; B60K 2370/1526; B60K 2370/1534; B60K 2370/52

See application file for complete search history.

(56) References Cited

U.S. PATENT DOCUMENTS

| | | | | |
|---|---|---|---|---|
| 10,248,228 | B2 * | 4/2019 | Minyu | G06F 3/0487 |
| 10,304,163 | B2 * | 5/2019 | Karunamuni | G06F 3/04886 |
| 10,606,378 | B2 * | 3/2020 | Rao | G06F 3/016 |
| 10,705,629 | B1 * | 7/2020 | Arnold | G06F 3/03547 |
| 10,850,708 | B2 * | 12/2020 | Chung | G06F 3/04886 |
| 11,299,047 | B1 * | 4/2022 | Szczerba | B60K 35/00 |

(Continued)

*Primary Examiner* — Ibrahim A Khan
(74) *Attorney, Agent, or Firm* — NSIP Law

(57) ABSTRACT

A display control system includes an input unit to receive position information of a knob, a memory to store a display control program in relation to a position of the knob, and a processor to execute the display control program to change a display of content in a display in consideration of the position information of the knob in relation to movement of the knob.

17 Claims, 28 Drawing Sheets

(56) References Cited

U.S. PATENT DOCUMENTS

| | | | | |
|---|---|---|---|---|
| 11,630,628 | B2* | 4/2023 | Sukegawa | G06F 3/14 345/173 |
| 2002/0171627 | A1* | 11/2002 | Noguchi | B60K 35/10 345/184 |
| 2006/0026535 | A1* | 2/2006 | Hotelling | G06F 3/0488 715/863 |
| 2008/0238874 | A1* | 10/2008 | Yamamoto | B60K 35/10 345/163 |
| 2009/0066474 | A1* | 3/2009 | Kawachi | B60K 35/10 340/3.1 |
| 2010/0259375 | A1* | 10/2010 | Ferren | G06F 3/04847 340/462 |
| 2011/0115784 | A1* | 5/2011 | Tartz | G06F 1/1624 345/173 |
| 2011/0130921 | A1* | 6/2011 | Ono | B60K 35/00 701/1 |
| 2012/0123636 | A1* | 5/2012 | Hisatsugu | B60K 35/00 701/1 |
| 2013/0050124 | A1* | 2/2013 | Helot | B60K 35/10 345/173 |
| 2013/0241720 | A1* | 9/2013 | Ricci | G06F 3/0486 715/765 |
| 2013/0249814 | A1* | 9/2013 | Zeng | G06F 3/04817 345/173 |
| 2014/0009415 | A1* | 1/2014 | Nishida | G06F 3/0416 345/173 |
| 2014/0095031 | A1* | 4/2014 | Boblett | B60G 17/015 701/49 |
| 2014/0153168 | A1* | 6/2014 | Hida | B60K 35/50 361/679.01 |
| 2014/0333602 | A1* | 11/2014 | Yang | G06F 1/3265 345/212 |
| 2014/0350784 | A1* | 11/2014 | Imai | G06F 3/0393 701/36 |
| 2014/0365126 | A1* | 12/2014 | Vulcano | G01C 21/3679 701/538 |
| 2014/0380243 | A1* | 12/2014 | Furue | G06F 3/0362 715/835 |
| 2015/0084878 | A1* | 3/2015 | Kim | G06F 3/041 345/173 |
| 2015/0130712 | A1* | 5/2015 | Hirai | G06F 3/04883 345/157 |
| 2015/0286358 | A1* | 10/2015 | Kim | G06F 3/04886 715/769 |
| 2015/0346888 | A1* | 12/2015 | Weyer | G06F 3/0412 345/173 |
| 2015/0353142 | A1* | 12/2015 | Iriguchi | B60N 3/102 296/70 |
| 2016/0071241 | A1* | 3/2016 | Karunamuni | G06F 3/04845 345/156 |
| 2016/0077730 | A1* | 3/2016 | Shim | G06F 3/04886 715/773 |
| 2016/0150020 | A1* | 5/2016 | Farmer | H04L 67/141 455/420 |
| 2016/0162126 | A1* | 6/2016 | Joo | G06F 3/0482 715/830 |
| 2016/0195989 | A1* | 7/2016 | Czelnik | G06F 3/0416 345/174 |
| 2017/0032915 | A1* | 2/2017 | Hatanaka | G06F 3/01 |
| 2017/0050521 | A1* | 2/2017 | Shaw | B60K 35/10 |
| 2017/0153718 | A1* | 6/2017 | Brown | B60K 35/10 |
| 2017/0314959 | A1* | 11/2017 | Chavez | G06F 3/04886 |
| 2017/0322760 | A1* | 11/2017 | Soh | G06F 3/1431 |
| 2018/0011551 | A1* | 1/2018 | Gothlin | G06F 3/016 |
| 2018/0107320 | A1* | 4/2018 | Im | B60K 35/10 |
| 2018/0154774 | A1* | 6/2018 | Park | G06F 1/1654 |
| 2018/0210551 | A1* | 7/2018 | Kitagawa | G06F 3/04847 |
| 2018/0275860 | A1* | 9/2018 | Dellinger | G06F 3/02 |
| 2018/0373350 | A1* | 12/2018 | Rao | G06F 3/0482 |
| 2019/0079717 | A1* | 3/2019 | Lee | G06F 3/0488 |
| 2019/0310718 | A1* | 10/2019 | Eraslan | G06F 3/0393 |
| 2019/0391671 | A1* | 12/2019 | Pfau | G06F 3/0362 |
| 2020/0117288 | A1* | 4/2020 | Lopez | G06F 3/0362 |
| 2020/0159366 | A1* | 5/2020 | Matsuda | G10L 15/22 |
| 2020/0164835 | A1* | 5/2020 | Chung | B60R 25/252 |
| 2020/0174587 | A1* | 6/2020 | Park | G06F 3/1454 |
| 2020/0201521 | A1* | 6/2020 | Faulkner | G06F 3/0484 |
| 2021/0055806 | A1* | 2/2021 | Shepelev | B60K 35/10 |
| 2021/0333900 | A1* | 10/2021 | Cho | B60K 35/00 |
| 2021/0402879 | A1* | 12/2021 | Wang | H02J 50/005 |
| 2022/0135112 | A1* | 5/2022 | Harmon | B60K 35/60 180/334 |

\* cited by examiner

FIG. 2
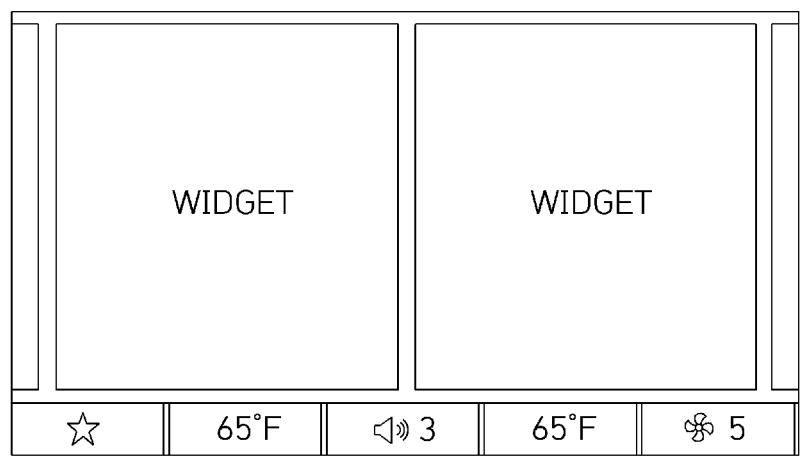
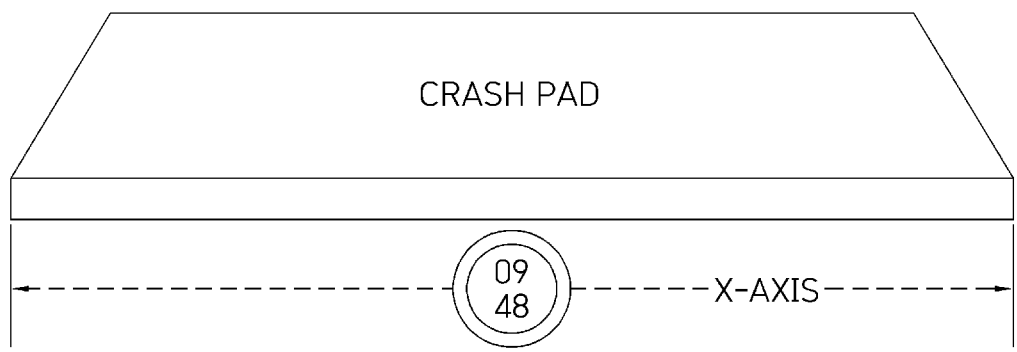

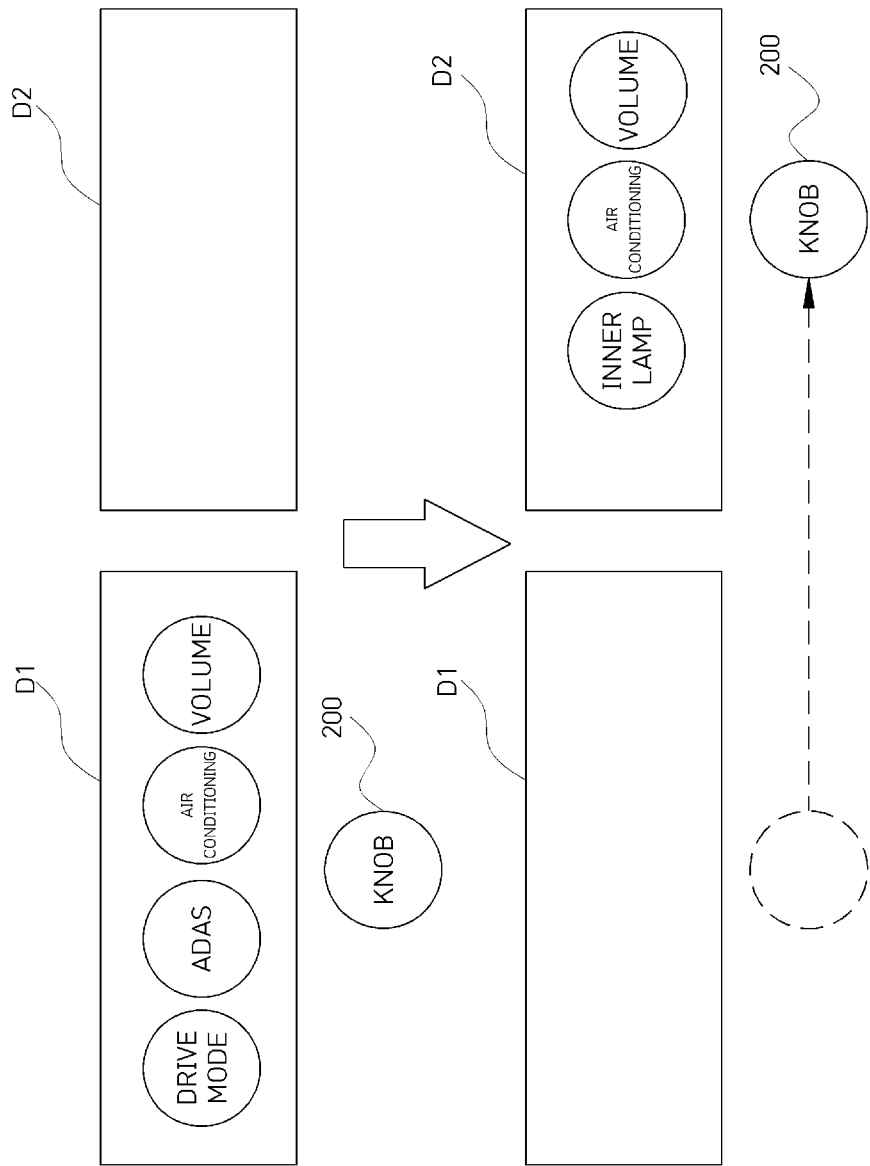

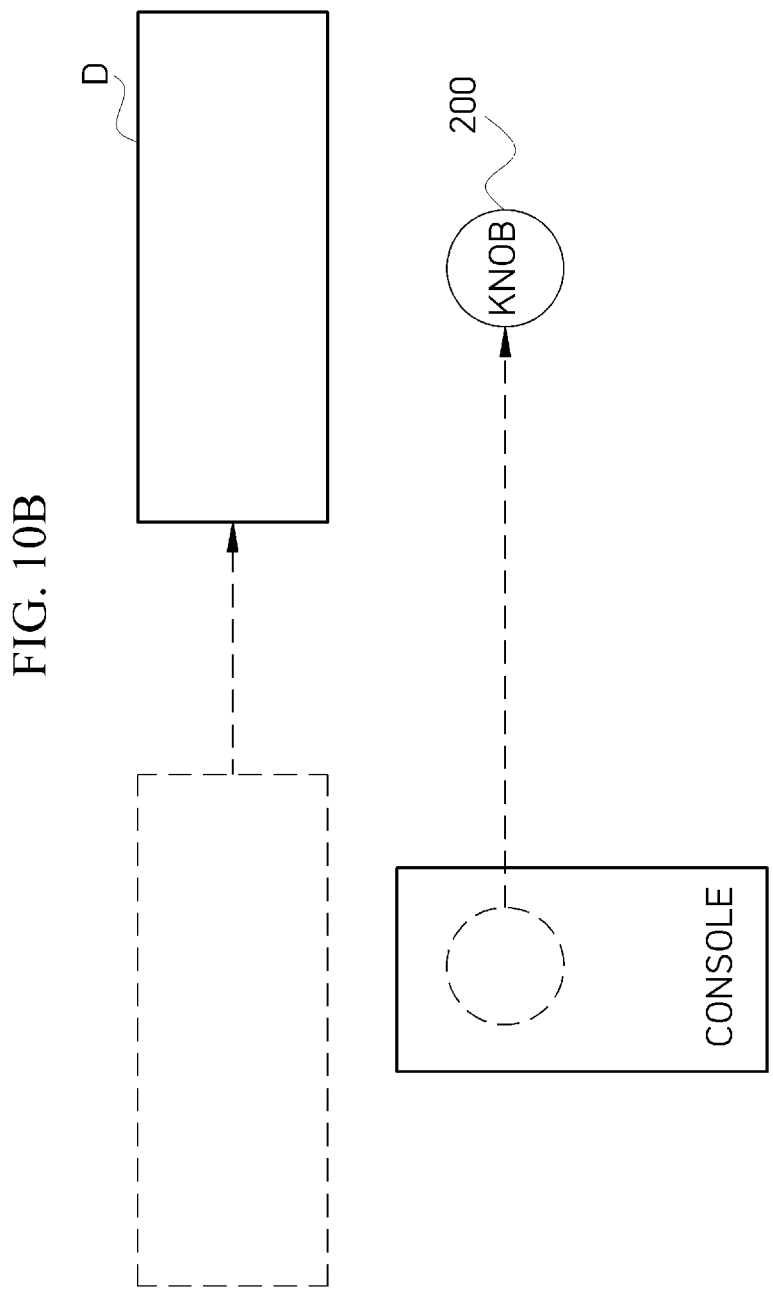

FIG. 12A
(a) 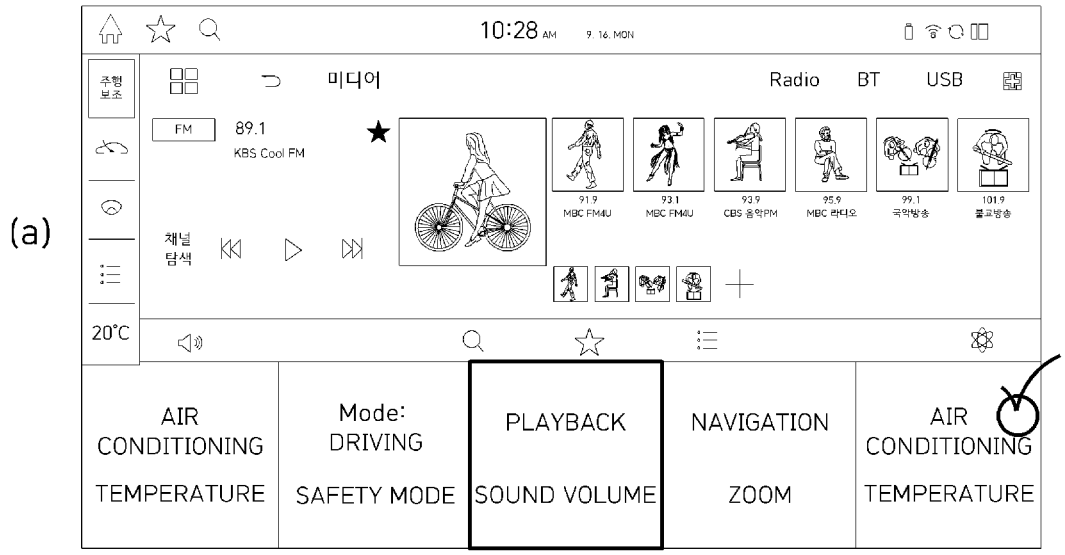
SCREEN TOUCH
(b) 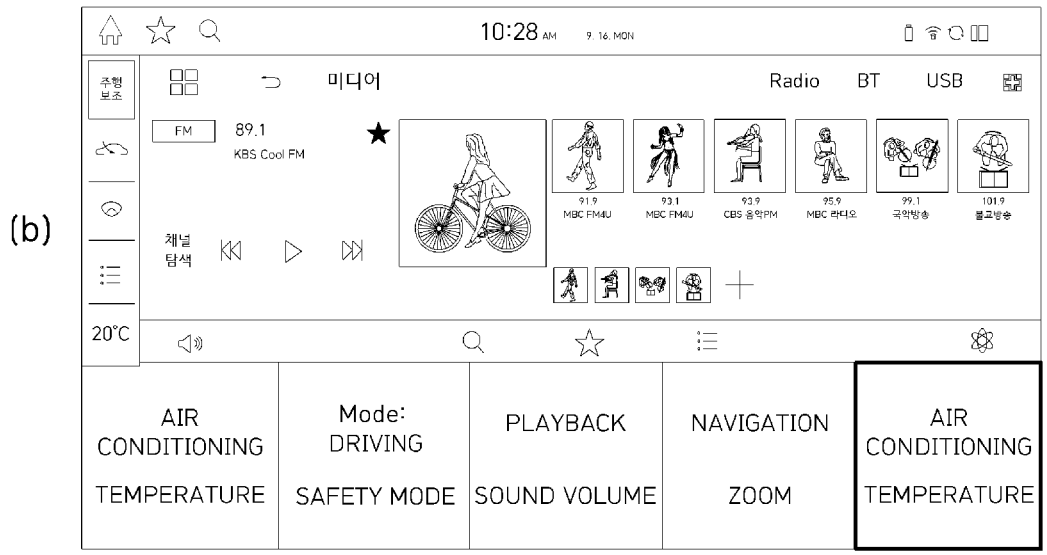
 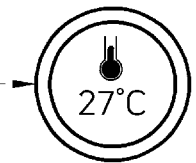

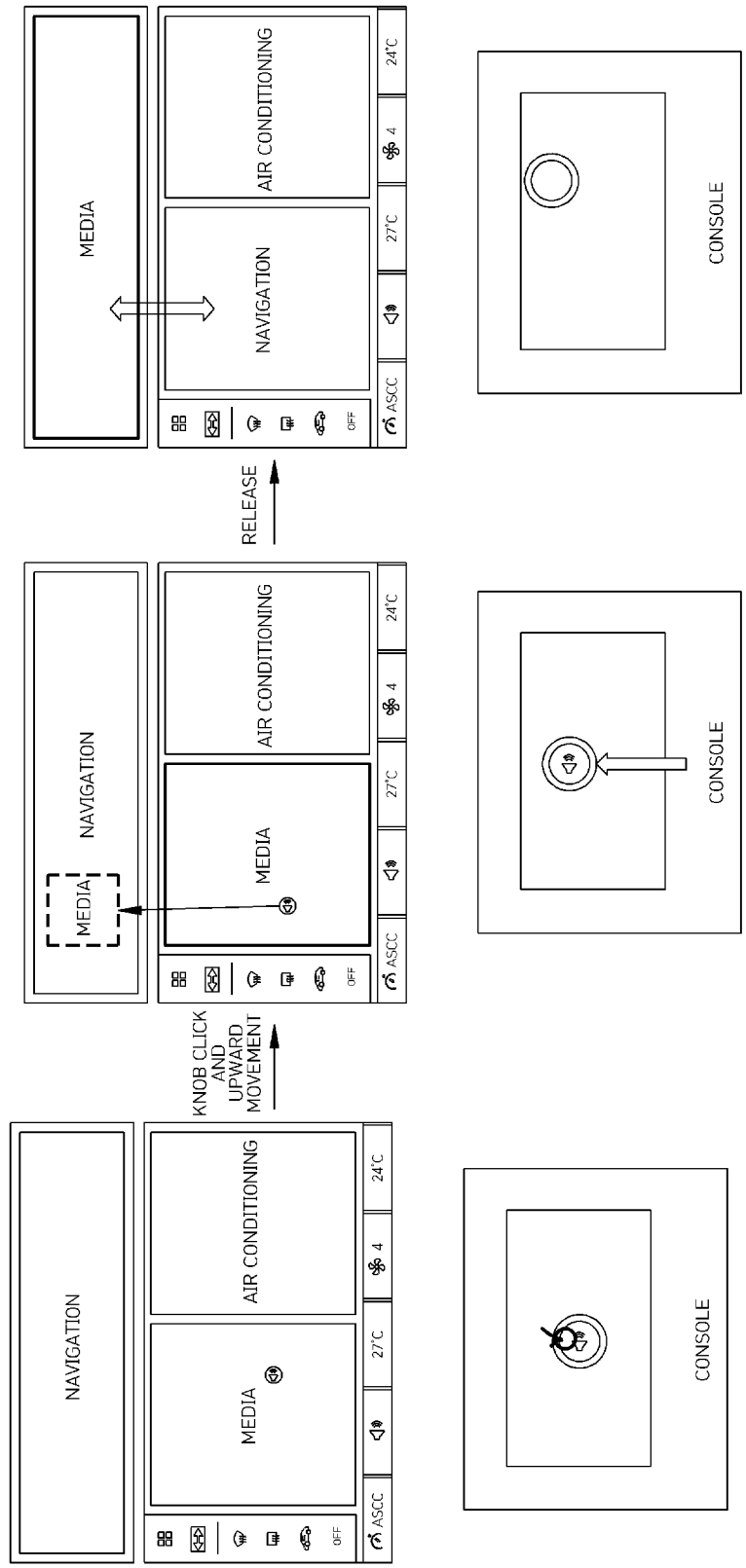

DISPLAY CONTROL SYSTEM USING KNOBS

CROSS-REFERENCE TO RELATED APPLICATIONS

This application claims priority to and the benefit of Korean Patent Application No. 10-2021-0089839, filed on Jul. 8, 2021, and Korean Patent Application No. 10-2021-0089840, filed on Jul. 8, 2021, the disclosures of which are incorporated herein by reference in their entirety.

BACKGROUND

1. Technical Field

The present disclosure relates to a display control system using knobs.

2. Related Art

Conventionally, an in-vehicle function is executed by an input device (knob) (temperature control, air volume control, or the like).

Such a knob is pushed or rotated in its mounted area to support user's command input for execution of functions. However, the knob may not be removed from a display and may not be spatially compatible between a screen to be operated and a controller in terms of usability, resulting in no provision of a wider range of user benefits.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

Various embodiments are directed to a display control system capable of performing screen change and 3D UI control depending on the position of a knob and of increasing the convenience of use by changing the position of the knob depending on the setting of a display to a landscape/portrait view mode.

In one general aspect, a display control system includes an input unit configured to receive position information of a knob, a memory configured to store a display control program in relation to a position of the knob, and a processor configured to execute the display control program to change a display of content in a display in consideration of the position information of the knob in relation to movement of the knob.

The processor may determine a function menu selected on the display as the knob, which is disposed on a crash pad or a bottom area of the display, slides in a first axis direction.

The processor may check selection of the content displayed in the display and provide a focusing function for the content displayed in the display, in consideration of position information changed in an axial direction in which the knob is moved.

The processor may display a sub-function for a selected function as the knob is rotated in a second axis direction.

The processor may display a control screen for a selected function as the knob is rotated in a second axis direction.

The processor may display a screen for rotating a selected 3D object as the knob is rotated in a second axis direction.

The memory may store a program for controlling the position of the knob in relation to landscape and portrait view modes of the display, and the processor may move the knob to a bottom area of the display in response to a conversion of the landscape and portrait view modes of the display.

The processor may determine an area for displaying a function menu selectable by the knob in response to the conversion of the landscape and portrait view modes.

The processor may display the function menu in the bottom area of the display when the display is in the landscape view mode, and may display the function menu in a central area within the display when the display is in the portrait view mode.

When the knob is located at a position for selecting a first function menu before the conversion of the landscape and portrait view modes, the processor may determine that the knob is located at the position for selecting the first function menu after the conversion of the landscape and portrait view modes in consideration of a range of movement of the knob after the conversion of the landscape and portrait view modes.

In another general aspect, a display control method performed by a display control system includes checking position information of a knob and changing display of content in a display in relation to the position information of the knob.

The knob may be disposed on a crash pad or a bottom area of the display, and the method may include checking a change in position depending on sliding of the knob and determining a function selected from functions displayed on the display in response to the change in position.

In the changing the display of the content, a sub-function or a control screen for a selected function may be displayed as the knob is rotated.

In the changing the display of the content, a screen for rotating a selected 3D object may be displayed as the knob is rotated.

Other features and aspects will be apparent from the following detailed description, the drawings, and the claims.

BRIEF DESCRIPTION OF THE DRAWINGS

FIG. 2 is a view for explaining function UI display and control in relation to knob sliding and knob position according to an embodiment of the present disclosure.

FIG. 8 is a view illustrating a display that is controlled by moving a knob according to one embodiment of the present invention;

FIG. 10A and FIG. 10B are set of views illustrating the display that is controlled when the knob is removed according to one embodiment of the present invention;

FIG. 12A and FIG. 12B are set of views illustrating a knob that is moved to a touch area according to another embodiment of the present invention;

FIG. 23 is a view illustrating windows that are switched using the knob according to still another embodiment of the present invention.

DETAILED DESCRIPTION

The above and other objects, advantages, and features of the present disclosure and methods of achieving them will become apparent with reference to the embodiments described below in detail in conjunction with the accompanying drawings.

The present disclosure may, however, be embodied in different forms and should not be construed as limited to the embodiments set forth herein. The following embodiments are provided solely to facilitate the purpose, configuration and effect of the disclosure to those of ordinary skill in the art to which the present disclosure pertains, and the scope of the present disclosure is defined by the appended claims.

Meanwhile, the terms used herein are for the purpose of describing the embodiments and are not intended to limit the disclosure. As used herein, the singular forms "a", "an" and "the" are intended to include the plural forms as well, unless context clearly indicates otherwise. It will be understood that the terms "comprises"/"includes" and/or "comprising"/ "including" when used in the specification, specify the presence of stated components, steps, motions, and/or elements, but do not preclude the presence or addition of one or more other components, steps, motions, and/or elements.

Figure 1:
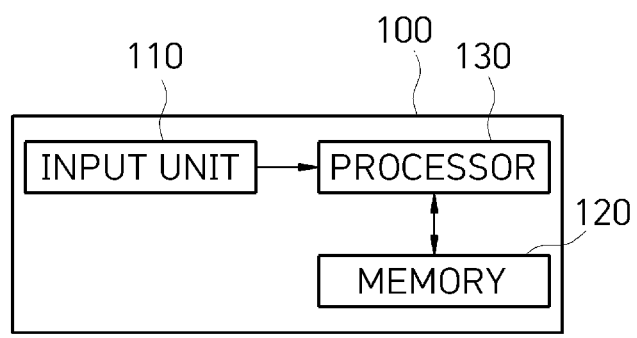
FIG. 1 illustrates a display control system using knobs according to an embodiment of the present disclosure.

FIG. 1 illustrates a display control system using knobs according to an embodiment of the present disclosure.

The display control system 100 using knobs according to an embodiment of the present disclosure includes an input unit 110 configured to receive position information of a knob, a memory 120 configured to store a display control program in relation to the position of the knob, and a processor 130 configured to execute the program. The processor 130 changes display of content in a display in consideration of the position information in relation to the movement of the knob.

The processor 130 determines a function menu selected on the display as the knob disposed on a crash pad or a bottom area of the display slides in a first axis direction.

The processor 130 checks the selection of the content displayed in the display and provides a focusing function for the content displayed in the display, in consideration of the position information changed in an axial direction in which the knob is moved.

The processor 130 displays a sub-function for the selected function as the knob is rotated in a second axis direction.

The processor 130 displays a control screen for the selected function as the knob is rotated in the second axis direction.

The processor 130 displays a screen for rotating the selected 3D object as the knob is rotated in the second axis direction.

A display control system using knobs according to another embodiment of the present disclosure includes an input unit 110 configured to receive setting information of landscape and portrait view modes of a display, a memory 120 configured to store a program for controlling a position of a knob in relation to the landscape and portrait view modes of the display, and a processor 130 configured to execute the program. The processor 130 moves the knob to the bottom area of the display in response to the conversion of the view modes of the display.

The processor 130 determines an area for displaying a function menu selectable by the knob in response to the conversion of the landscape and portrait view modes.

The processor 130 displays the function menu in the bottom area of the display when the display is in the landscape view mode, and displays the function menu in a preset central area within the display when the display is in the portrait view mode.

When the knob is located at a position for selecting a first function menu before the conversion of the view modes, the processor 130 determines that the knob is located at the position for selecting the first function menu after the conversion of the view modes in consideration of the range of movement of the knob after the conversion of the view modes.

A display control system using knobs according to still another embodiment of the present disclosure includes an input unit 110 configured to receive position information of a knob, a memory 120 configured to store a display control program in relation to the position of the knob, and a processor 130 configured to execute the program. The processor 130 changes a function control tab displayed on a display in consideration of the position information in relation to the movement of the knob.

As the knob is moved from the lower portion of a driver's seat display to the lower portion of a passenger's seat display, the processor 130 displays a control tab for a convenience function with little relevance to driving in the area of the passenger's seat display and displays a control tab for a function with high relevance to driving in the area of the driver's seat display.

The processor 130 changes the division of the area of the display in consideration of the position information in relation to the movement of the knob, and controls the displayed content to be changed in response to the change of the division of the area.

The processor 130 maintains the screen area for the preset function in the display as the same display area based on the driver's position even when the display is moved.

When the position of the display is changed in response to the movement of the knob, the processor 130 changes the number of screen areas of the display and changes the type of content displayed in response to the changed number of screen areas.

When the knob is removed from a console, the processor 130 moves the area of the display in consideration of the current position of the removed knob.

When the knob is moved from the driver's seat area to the passenger's seat area, the processor 130 controls the personalized screen provided to the passenger to be displayed on the display moved to the passenger's seat, and displays a driving-related function screen on the driver's seat front windshield.

When the knob is moved from the passenger's seat area to the driver's seat area, the processor 130 displays the personalized screen provided to the passenger on the passenger's seat front windshield, but deactivates a passenger's seat front windshield display function if it is determined that driving is disturbed.

The processor 130 transmits a control command to tilt the display in consideration of the current position information of the knob and the user's gaze at the current position of the knob.

A display control system using knobs according to yet another embodiment of the present disclosure includes an input unit 110 configured to receive a touch input signal for an area of a display, a memory 120 configured to store a display control program in relation to the touch input signal, and a processor 130 configured to execute the program. The processor 130 moves a knob to enable function control of an area to which the touch input signal is applied.

The processor 130 controls the knob to move to the lower portion of the area to which the touch input signal is applied within the limited movement area of the knob.

The processor 130 controls the knob to move over the display area to which the touch input signal is applied.

The processor 130 compares the easiness of function control through touch input with the easiness of function control through knob operation. The processor 130 then moves the knob over the display area to which the touch input signal is applied when it is determined that the easiness of function control through knob operation is greater than the easiness of the function control through touch input.

The processor 130 displays in-vehicle seat arrangement information and a function provided through the area of each seat on the display, and moves the knob to that area when touch input is applied to that functional area.

When the display is rotated, the processor 130 calculates coordinates in the display to move the knob.

When touch input to the navigation screen is applied, the processor 130 provides a function to control zoom in and zoom out through the knob. When touch input for route information is applied on the navigation screen, the processor provides a function to control the display of the next route and related road information through the knob.

A display control system using knobs according to a further embodiment of the present disclosure includes an input unit 110 configured to receive at least one of position information of a knob within a movement range of a bottom area of a display and position information of the knob in a preset flat area, a memory 120 configured to store a display control program using the position information of the knob, and a processor 130 configured to execute the program. The processor 130 controls an in-vehicle function in consideration of position information in relation to the movement of the knob and operation information of the knob.

When the knob moves to a position corresponding to the function menu displayed on the bottom area of the display within a movement range, the processor 130 transmits a control command for that function menu in consideration of the position information of the knob.

When tap input to the knob is applied at a position corresponding to the function menu, the processor 130 invokes a pop-up screen for that function.

When the operation of the knob is recognized at a position corresponding to the volume control function menu, the processor 130 controls a media volume when media is being played and controls an overall system volume when media is not being played.

The processor 130 controls the function menu in consideration of the rotation, push, and push holding times of the knob.

When the knob is moved to the area of the bookmark function menu, the processor 130 displays a menu corresponding to the bookmark on the display and displays the function selected through knob operation on the main screen.

When the knob is detached within the movement range of the bottom area of the display and mounted on the console, which is a preset flat area, the processor 130 controls the display in consideration of the knob position information in the console area in the same proportion as the display screen.

The processor 130 displays a cursor on the display screen in response to the movement of the knob in the console area.

The processor 130 provides a window switching function when the cursor is moved by operation of the knob on the partitioned area in the display.

FIG. 2 is a view for explaining function UI display and control in relation to knob sliding and knob position according to an embodiment of the present disclosure.

According to the embodiment of the present disclosure, the knob is disposed on a crash pad or a bottom area of a display and slides left and right (x-axis).

As the knob slides left and right, it is possible to control bookmarks, driver's seat temperature setting, content volume setting, passenger's seat temperature setting, and air volume setting.

As the knob slides left and right, the screen of the knob in a basic mode is set as a time display (e.g., 0948 displays 9:48). As the knob slides to a specific area, the screens of bookmarks, driver's seat temperature setting, content volume setting, passenger's seat temperature setting, and air volume setting are displayed on the knob, and functions may be set by rotating the knob.

In this case, a focused UI for the currently selected function is provided on the display screen by sliding the knob. Accordingly, as the user slides the knob with one hand, the user may intuitively check which vehicle function is settable using the current knob.

As such an example, FIG. 2 illustrates an example in which the bookmark item is focused.

Figure 3:
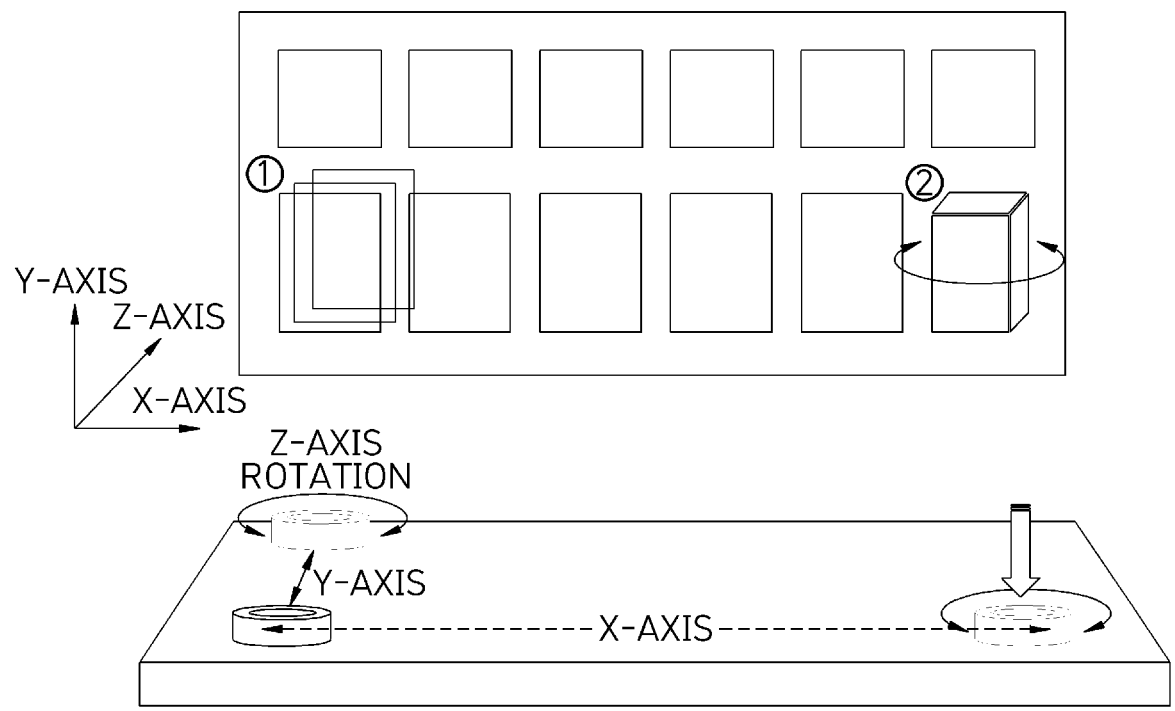
FIG. 3 is a view for explaining 3-axis knob operation and display control therethrough according to an embodiment of the present disclosure.

FIG. 3 is a view for explaining 3-axis knob operation and display control therethrough according to an embodiment of the present disclosure.

By changing the position of the knob on the crash pad or in the bottom area of the display, an on-screen functional UI display and control function is provided utilizing 3 axes (x, y, and z axes).

Referring to FIG. 3, as the knob slides left and right along the x-axis, it is possible to transversely select a plurality of function menus displayed on the display area.

Referring to FIG. 3, as the knob slides up and down along the y-axis, it is possible to vertically select a plurality of function menus displayed on the display area.

Referring to FIG. 3, as the knob is rotated along the z-axis, it is possible to display a sub-function of the selected function (focused on the display area) or enter a sub-function to control that function.

Referring to FIG. 3, as the knob is rotated along the z-axis, it is possible to display a function of the selected 3D object menu (focused on the display area) or control the 3D object to be displayed.

In addition, by pressing the knob, it is possible to execute the currently selected function.

Figure 4:
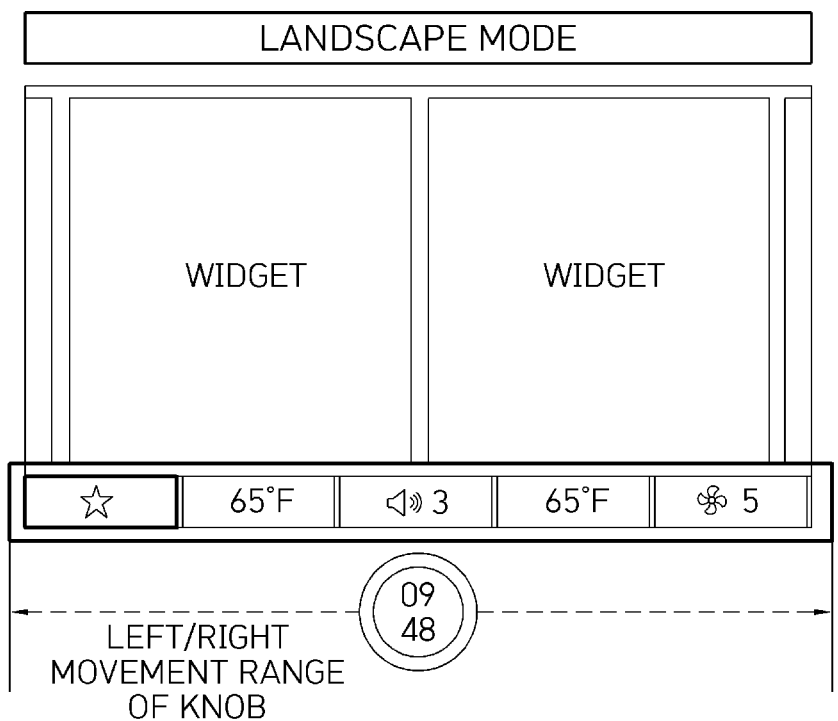
FIG. 4 illustrates a knob and a UI screen in a landscape mode according to an embodiment of the present disclosure.

FIG. 4 illustrates a knob and a UI screen in a landscape mode according to an embodiment of the present disclosure.

According to the embodiment of the present disclosure, it is possible for the display to display content in a landscape or portrait mode. Referring to FIG. 4, the display in the landscape mode displays related UIs at the bottom of the display to display UIs for bookmarks, driver's seat air conditioning setting, content volume setting, passenger's seat air conditioning setting, and air volume setting.

As the knob slides left and right, the selected function menu is displayed in a preset method (e.g., focusing method) in the display area. As the knob and the function selection menu screen on the display are controlled to be displayed integrally, the user may intuitively recognize the function menu selection and control setting.

Figure 5:
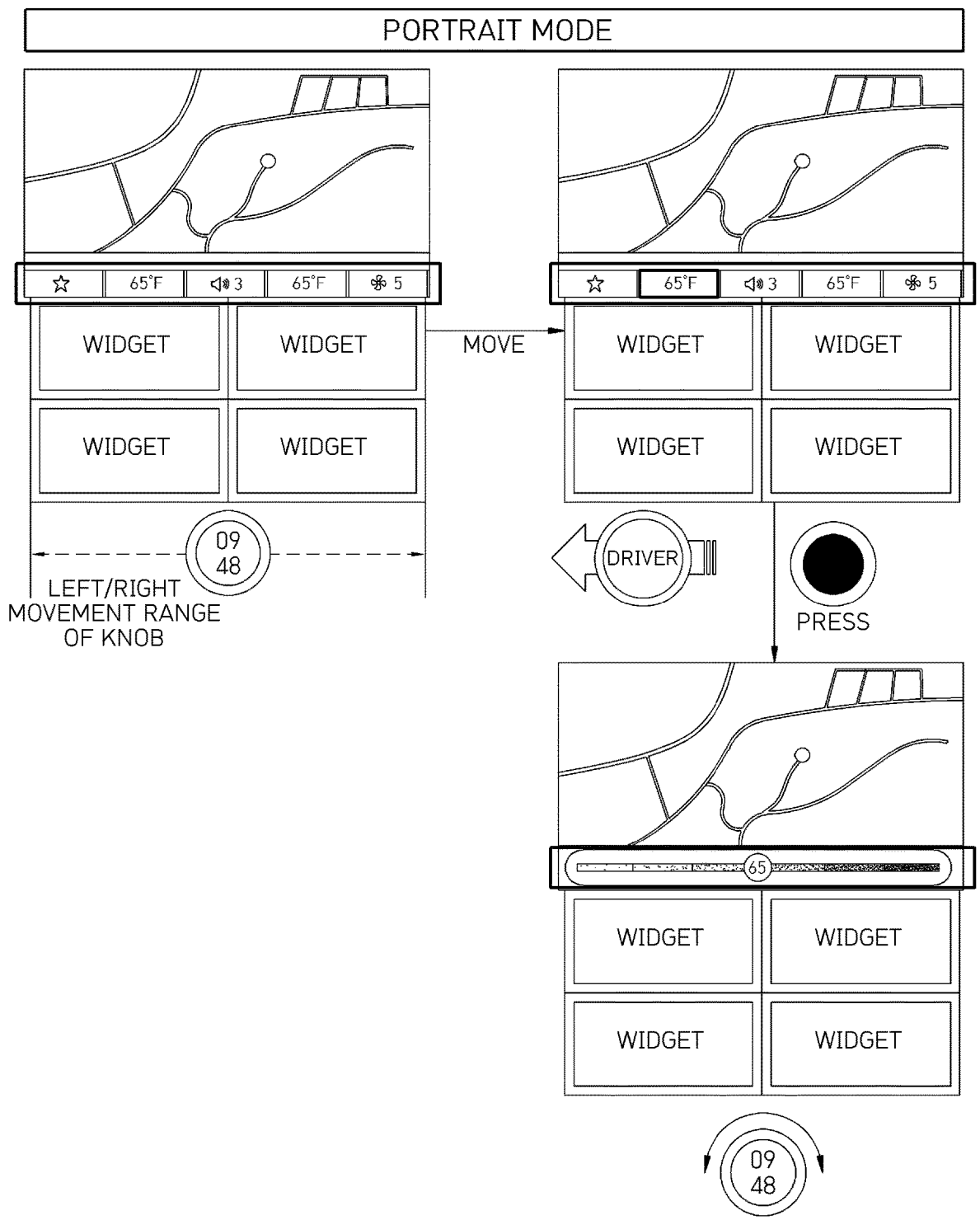
FIG. 5 illustrates a knob and a UI screen in a portrait mode according to an embodiment of the present disclosure.

FIG. 5 illustrates a knob and a UI screen in a portrait mode according to an embodiment of the present disclosure.

When the display is set to a portrait view mode, the knob operation menu UI is displayed on the top or central area of the display, thereby preventing the driver's gaze from departing.

In this case, the reach distance is shortened as the display and the position of the knob are changed, and since it is possible to operate the knob while placing an elbow on the console, the convenience of knob operation is improved.

Figure 6:
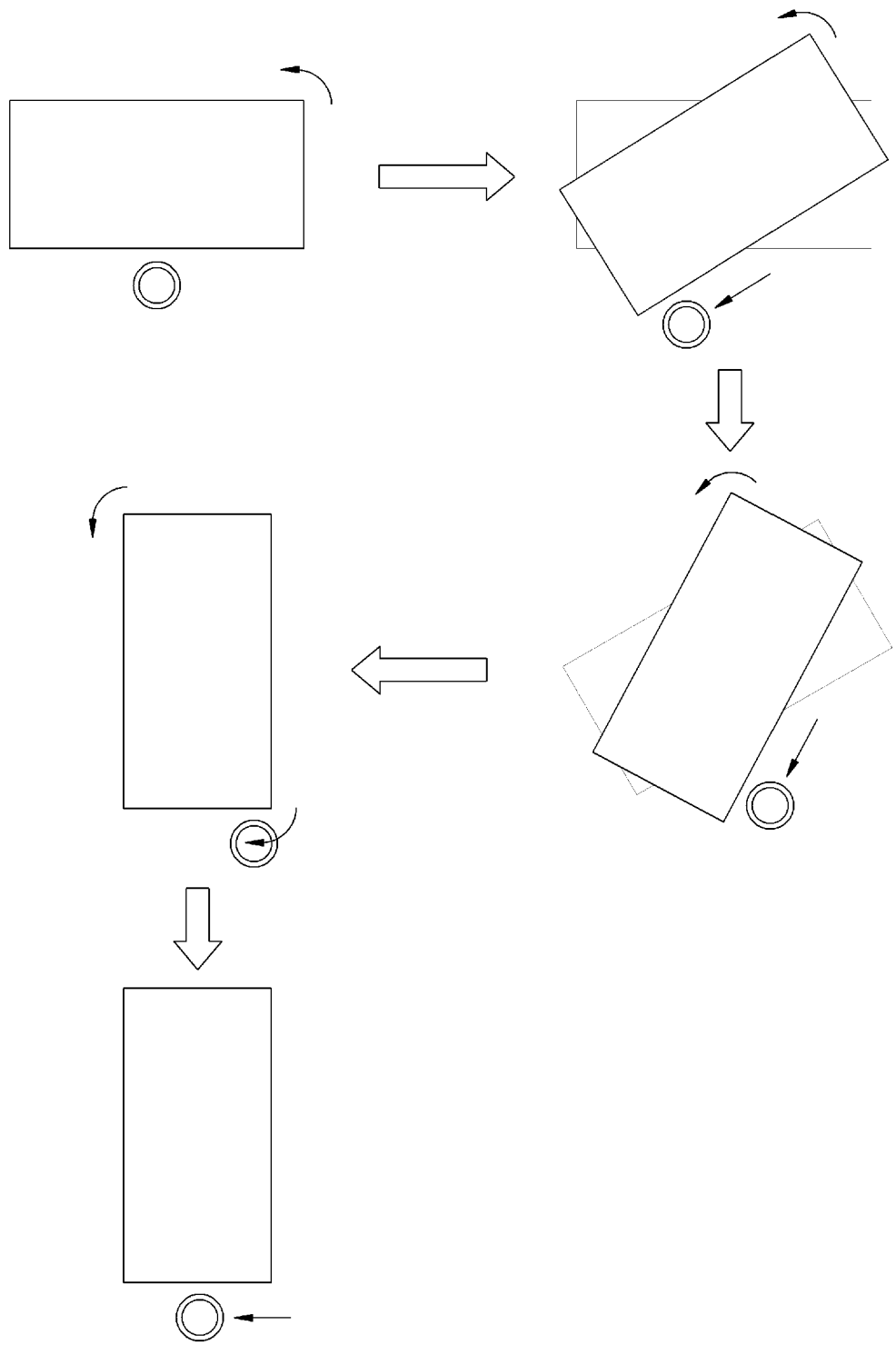
FIG. 6 illustrates an automatic change in knob position when a display is rotated according to an embodiment of the present disclosure.

FIG. 6 illustrates an automatic change in knob position when a display is rotated according to an embodiment of the present disclosure.

FIG. 6 illustrates a process in which the position of the knob is automatically changed when the display, which is in the landscape view mode, is rotated and changed to the portrait view mode.

In the landscape mode, the knob located in the first area is changed to the portrait mode. Accordingly, the knob is moved to a bottom area of the display in the portrait mode among the areas adjacent to the first area.

In addition, as the knob is rotated from the landscape mode to the portrait mode, the knob at the position corresponding to the first menu in the view mode before the change is moved to the position corresponding to the first menu in the view mode after the change in consideration of the position information of the menu area displayed in the display.

A display control method using knobs according to an embodiment of the present disclosure includes (a) a step of checking position information of a knob and (b) a step of changing display of content in a display in relation to the position information of the knob.

The knob is disposed on a crash pad or a bottom area of the display. In step (a), the method checks a change in position depending on the sliding of the knob, and in step (b), the method determines a function selected from the functions displayed on the display in response to the change in position.

In step (b), the method displays a sub-function or a control screen for the selected function as the knob is rotated.

In step (b), the method displays a screen for rotating a selected 3D object as the knob is rotated.

A display control method using knobs according to another embodiment of the present disclosure includes (a) a step of checking setting information of landscape and portrait view modes of a display and (b) a step of moving the knob in response to the conversion of the view modes of the display.

In step (b), the method determines a display area of the function menu that is displayed on the display and selected by movement of the knob in response to the conversion of the view modes of the display.

In step (b), the method displays the function menu in the bottom area of the display when the display is in the landscape view mode, and displays the function menu in a preset central area within the display when the display is in the portrait view mode.

In step (b), when the knob is located at a position for selecting a first function menu before the conversion of the view modes, the method determines that the knob is located at the position for selecting the first function menu after the conversion of the view modes in consideration of the range of movement of the knob after the conversion of the view modes.

Meanwhile, the display control method using knobs according to the embodiments of the present disclosure may be implemented in a computer system or recorded on a recording medium. The computer system may include at least one processor, a memory, a user input device, a data communication bus, a user output device, and a storage. These individual components perform data communication through the data communication bus.

The computer system may further include a network interface coupled to the network. The processor may be a central processing unit (CPU) or a semiconductor device that processes instructions stored in memory and/or storage.

The memory and storage may include various types of volatile or non-volatile storage media. For example, the memory may include ROM and RAM.

Accordingly, the display control method using knobs according to the embodiments of the present disclosure may be implemented in a computer-executable manner. When the display control method using knobs according to the embodiments of the present disclosure is performed in a computer device, computer-readable instructions may carry out the control method of the present disclosure.

Meanwhile, the display control method using knobs according to the present disclosure described above may be implemented as computer-readable codes on a computer-readable recording medium. The computer-readable recording medium includes all types of recording media to store data readable by computer systems. Examples of the computer-readable recording medium may include a read only memory (ROM), a random access memory (RAM), a magnetic tape, a magnetic disk, a flash memory, an optical data storage, and the like. Moreover, the computer-readable recording medium may be distributed on computer systems connected to a computer communication network, and stored and executed as readable codes in a distributed manner.

As is apparent from the above description, according to the present disclosure, it is possible to perform screen change and 3D UI control depending on the position of the knob, thereby increasing the convenience of use.

In addition, it is possible to increase the convenience of use by changing the position of the knob depending on the landscape/portrait view mode of the display.

The operation of the knob can easily change the position of the display in the vehicle, and the position of the display can be customized according to the position of the knob.

The user can easily operate the display by operating the knob at any position in the vehicle using the detachable knob.

Since the in-vehicle function is executable by moving the knob, it is possible to execute different functions with the minimum number of knobs and to reduce the number of buttons.

The present disclosure is not limited to the above effects, and other effects of the present disclosure will be clearly understood by those skilled in the art to which the present disclosure pertains from the above description.

While various embodiments have been described above, it will be understood to those skilled in the art that the embodiments described are by way of example only. Accordingly, the disclosure described herein should not be limited based on the described embodiments.

Figure 7A:
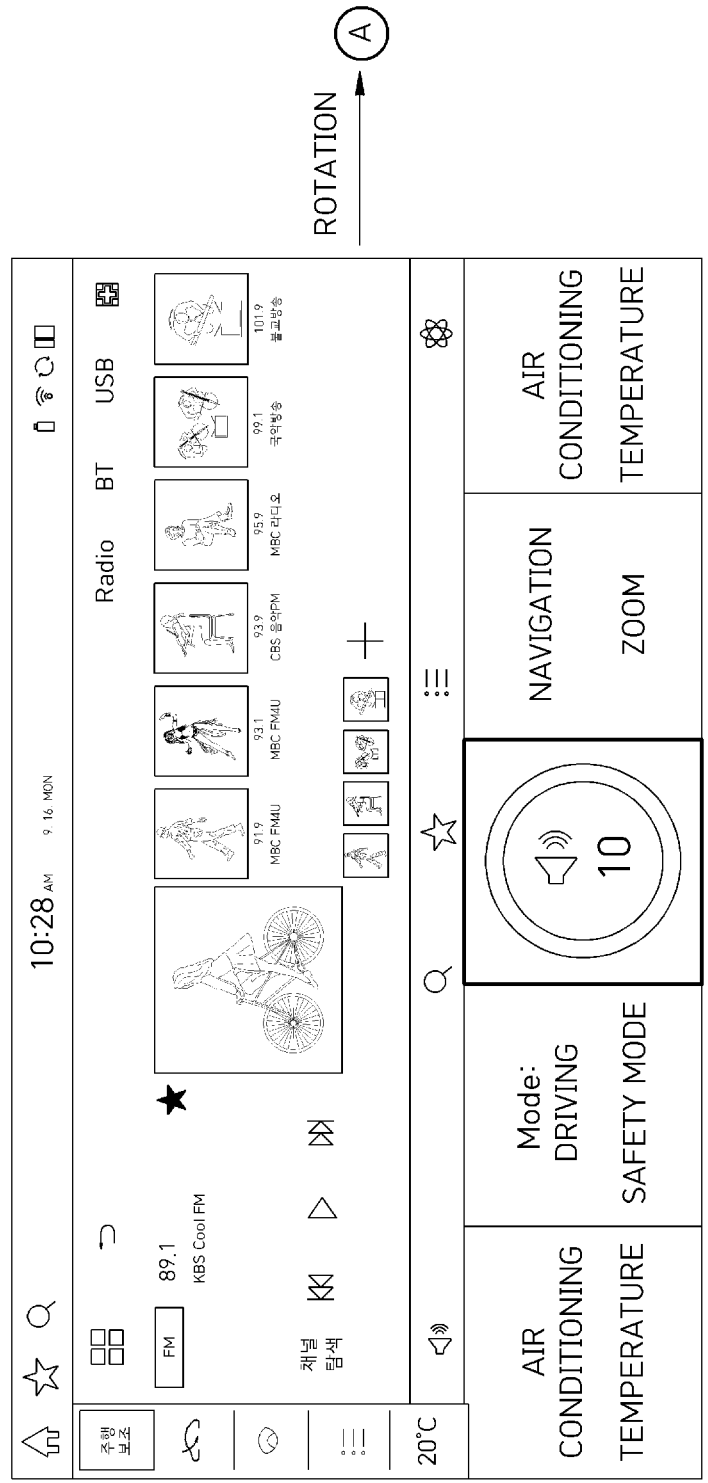
FIG. 7A, 7B, and FIG. 7C are views illustrating the rotation of the display and the movement of the knob according to another embodiment of the present invention.
Figure 7B:
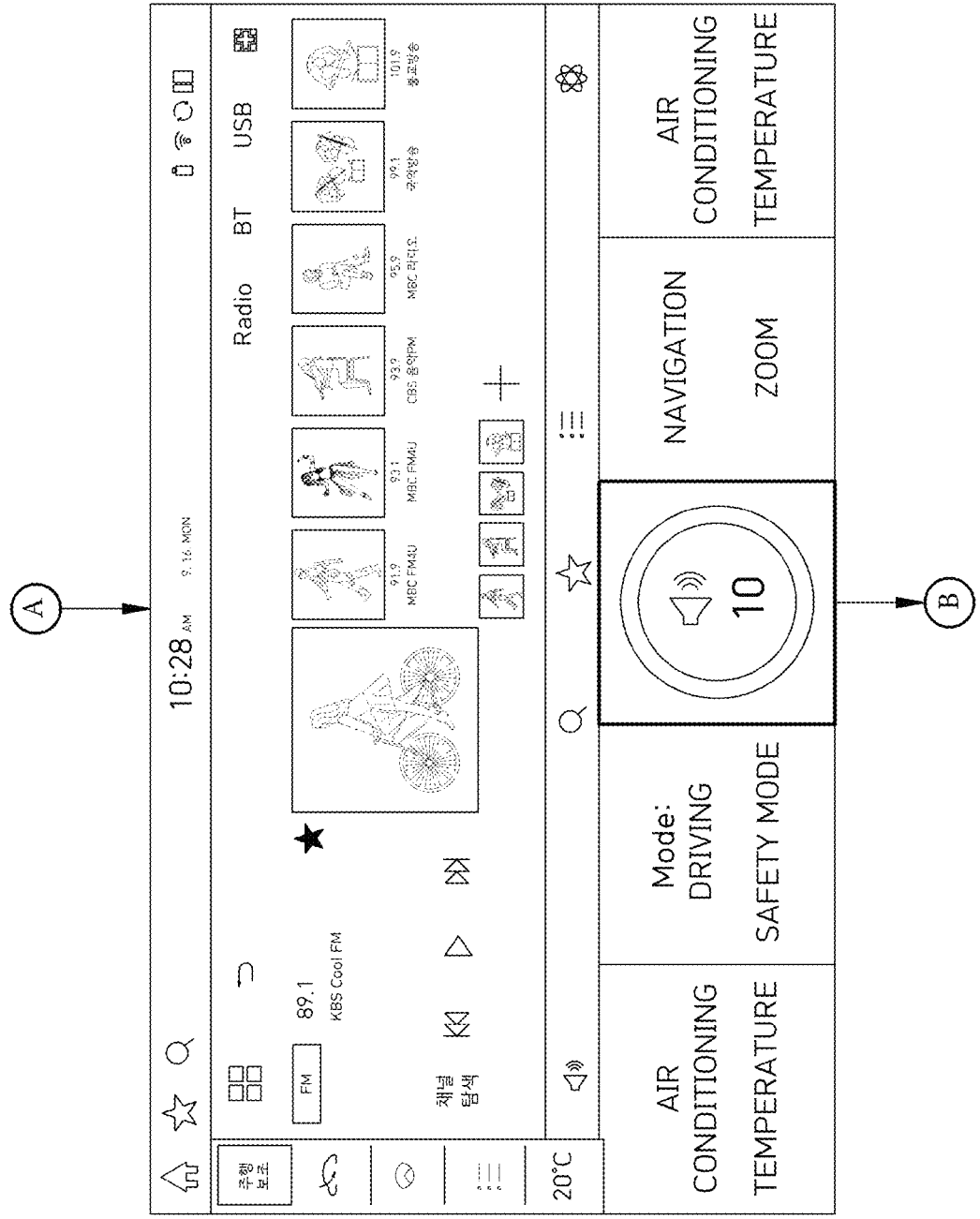
Figure 7C:
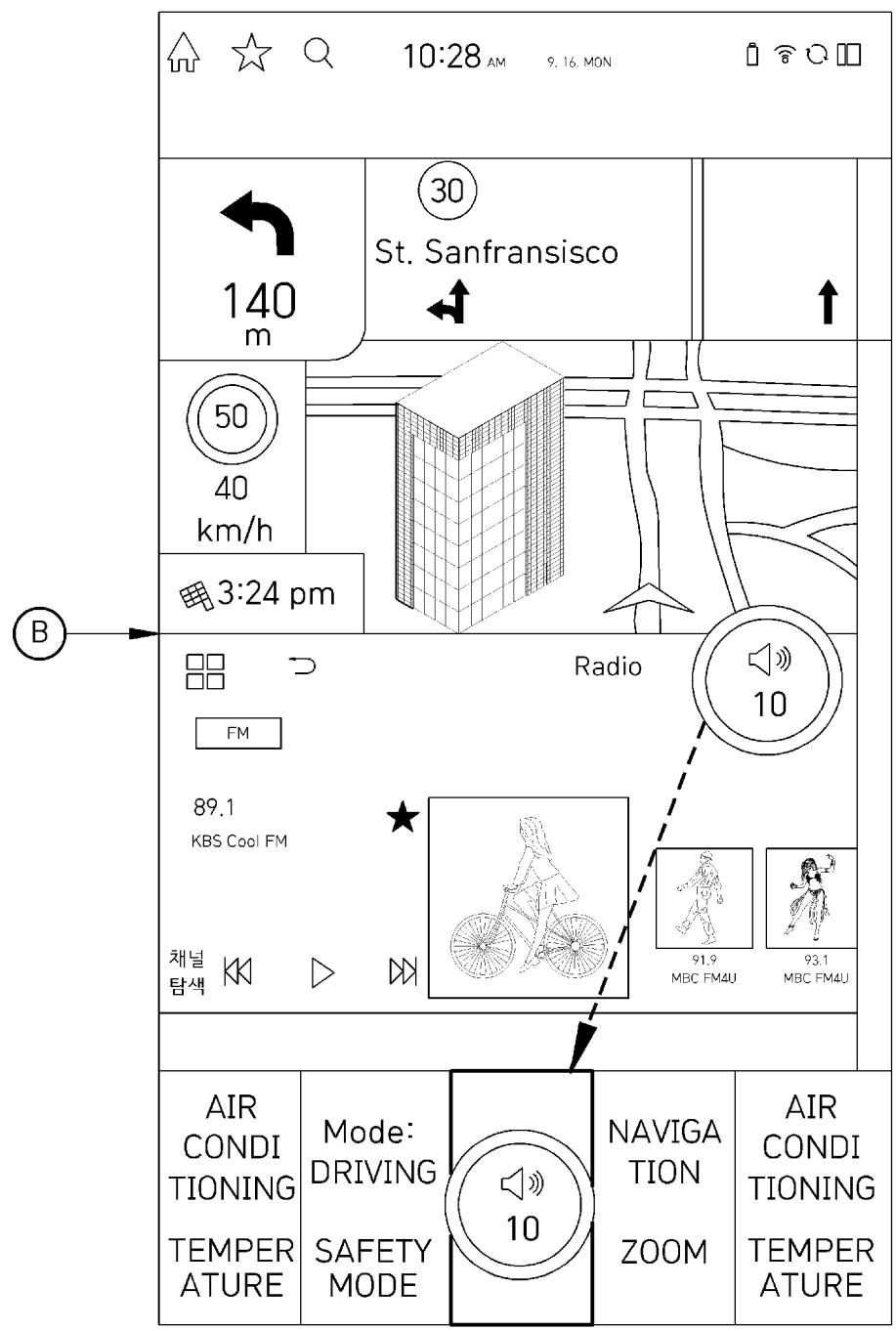

FIG. 7A to FIG. 7C are views illustrating the rotation of the display and the movement of the knob according to another embodiment of the present invention, In a lower end of the display, areas of air conditioning temperature, driving safety mode, volume, navigation, and air conditioning temperature are disposed.

As illustrated in FIG. 7A to FIG. 7C, as the display is rotated from landscape setting to portrait setting, the knob is moved to coordinates of a menu area at which the knob has been positioned in consideration of a menu area in the display.

FIG. 8 is a view illustrating a display that is controlled by moving a knob according to one embodiment of the present invention.

In a driver seat display D1, a menu including drive mode, advanced driver assistance systems (ADAS), air conditioning, and volume is displayed, and in a state in which there is no displayed item in a passenger seat display D2, a knob 200 is moved from under the driver seat display D1 to under the passenger seat display D2.

As the knob 200 is moved from under the driver seat display D1 to under the passenger seat display D2, available functions are changed, for example, in the driver seat display D1, functions, such as the ADAS and the drive mode, which are directly related to driving, may be manipulated, and in the passenger seat display D2, restricted functions, such as interior lamp, air conditioning, and volume, which are relatively less related to the driving, may be performed.

The processor 130 controls function control tabs displayed on the driver seat display D1 and the passenger seat display D2 in consideration of movement information of the knob 200.

As will be described below, as the knob 200 is manipulated to be rotated or pressed under a specific function control tab area or on the specific function control tab area, setting of a specific function is adjusted.

Figure 9:
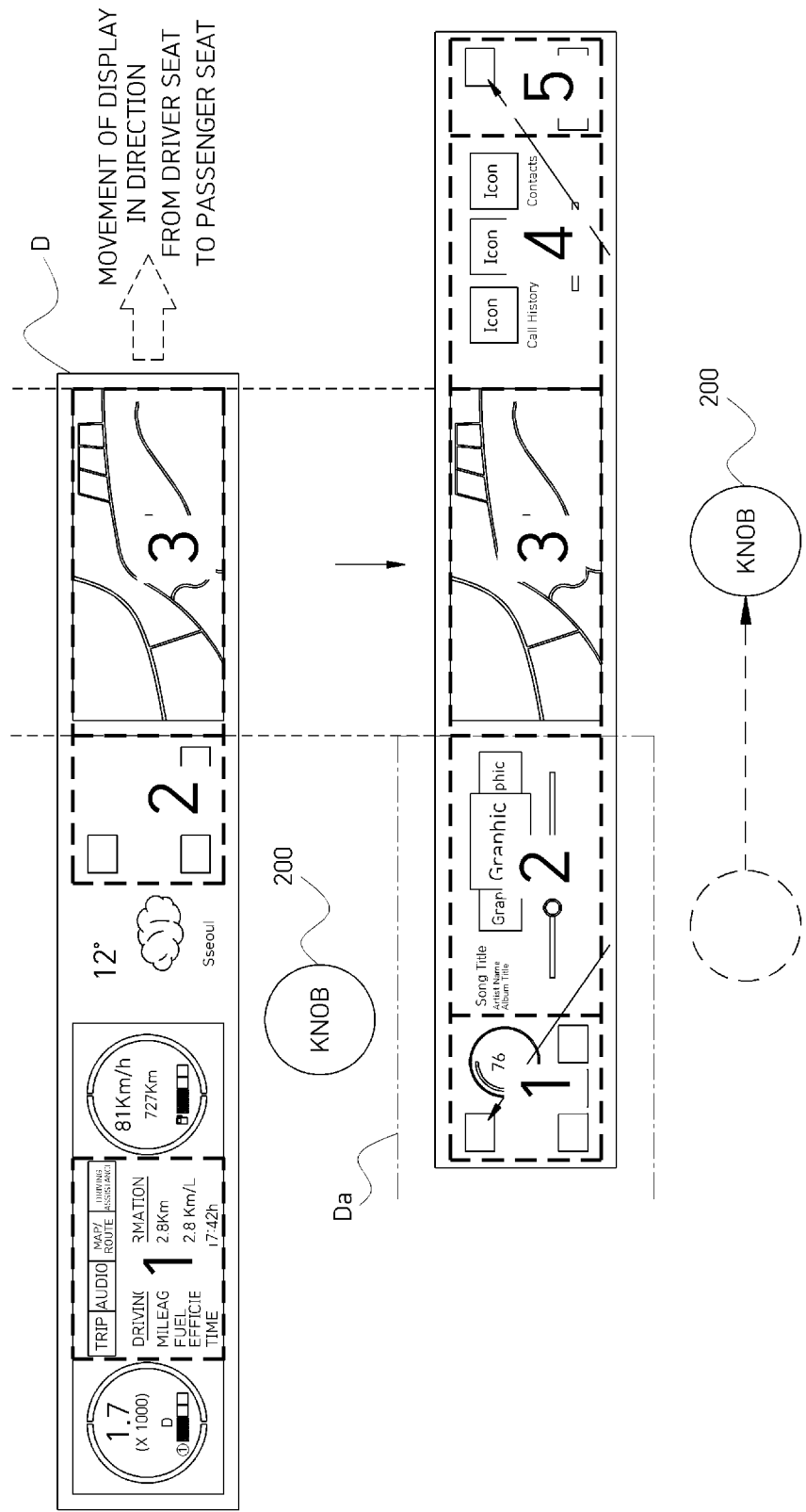
FIG. 9 is a view illustrating a change in user interface (UI) of the display when the knob is moved according to one embodiment of the present invention.

FIG. 9 is a view illustrating a change in user interface (UI) of the display according to one embodiment of the present invention.

A big screen display D is divided into a plurality of areas and moves in a direction from the driver seat to the passenger seat.

As the big screen display D is moved, a position of the knob may be changed, or as the position of the knob is changed, a position of the big screen display D may be changed.

As the big screen display D is moved, information and the UI displayed on the big screen display D are changed, and for example, a cluster and audio video navigation (AVN) are displayed on the big screen display D in front of the driver seat, and a mini-cluster and an AVN 3 screen are displayed thereon in front of the passenger seat.

Movement of the knob 200 occurs within a mechanically limited area between the driver seat and the passenger seat, or the knob 200 is detachably attached to a center fascia, and the processor 130 controls the information and the UI of the big screen display D in consideration of a state in which the knob 200 is spatially moved.

Figure 10A:
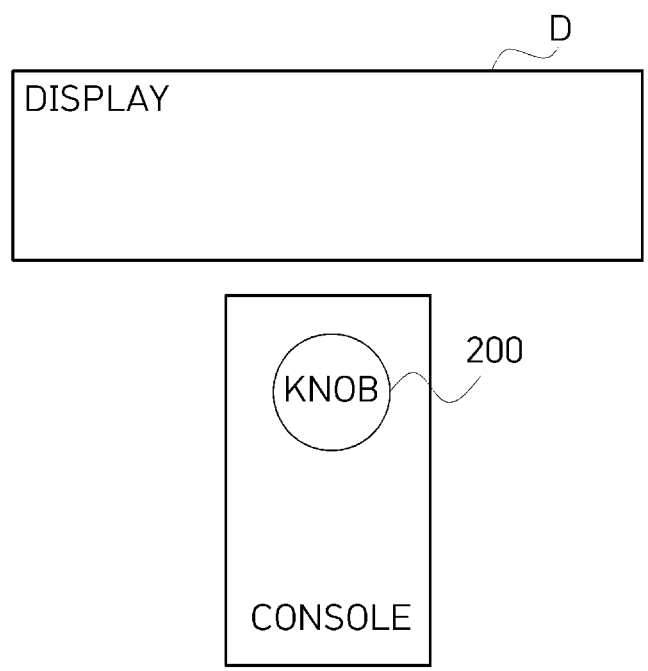

FIG. 10A and FIG. 10B are set of views illustrating the display that is controlled when the knob is removed according to one embodiment of the present invention.

As the knob 200 positioned on the console under the display D is removed from the console, the processor 130 moves the display D in consideration of the removal and a movement direction of the knob 200. Referring to FIG. 10A and FIG. 10B, as the knob 200 is removed from the console and moved in the direction from the driver seat to the passenger seat, a position of the display D is adjusted so that the display D is viewed from both of the driver seat and the passenger seat.

When the knob 200 is moved from the driver seat to the passenger seat, a personalized screen related to a passenger is displayed on the display D moved to the passenger seat, and a driving related screen is displayed as a head-up display (HUD) on a windshield in front of the driver seat.

When the knob 200 is moved from the passenger seat to the driver seat, the driving related screen is displayed on the display D moved to the driver seat, and the personalized screen related to the passenger of the passenger seat is displayed on the windshield in front of the passenger seat. In this case, in a case in which driving is hindered by displaying information on the windshield in front of the passenger seat, the display of the personalized screen related to the passenger of the passenger seat is turned off.

Figure 11A:
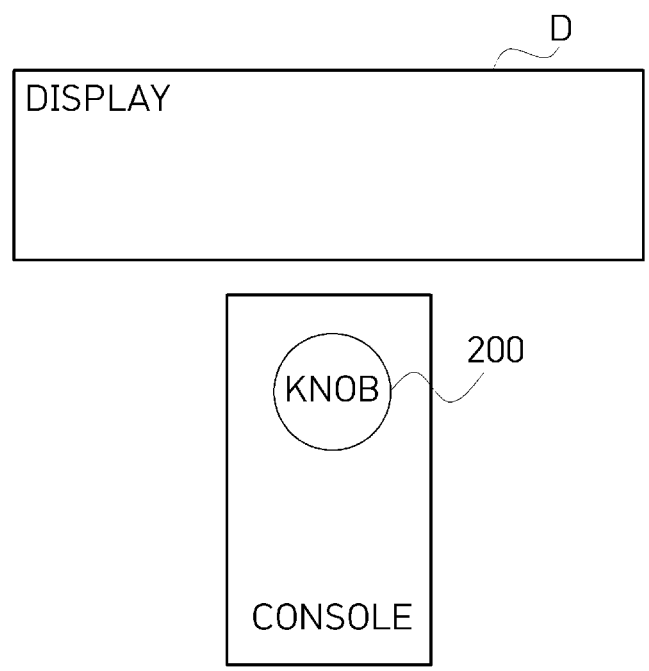
FIG. 11A and FIG. 11B are set of views illustrating a display unit that is tilted when the knob is removed according to one embodiment of the present invention.
Figure 11B:
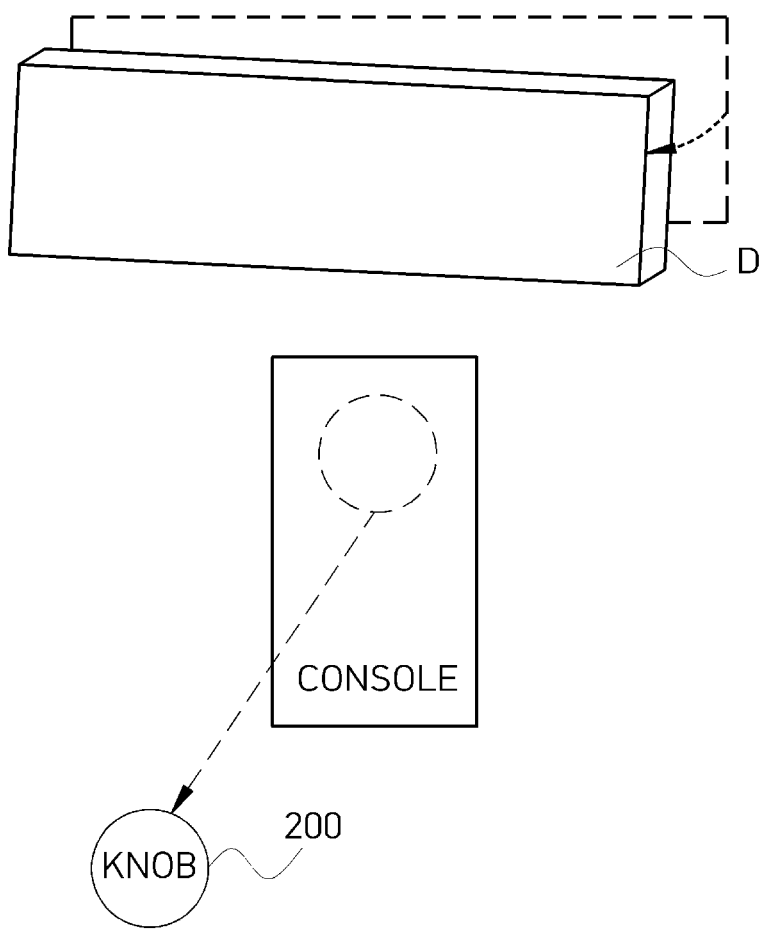

FIG. 11A and FIG. 11B are set of views illustrating the display D that is tilted when the knob is removed according to one embodiment of the present invention.

As the knob 200 positioned on the console under the display D is removed from the console, the display D is tilted in consideration of a position of the knob 200.

In a case in which a passenger in a rear seat takes the knob 200 (manipulation system), the display D is tilted so that a screen of the display D is easily viewed from the passenger having the knob in the rear seat.

In relation to a position of the knob in the vehicle, position information of the knob is checked using ultra wide band (UWB) technology.

In order to provide a local based service (LBS), technologies such as a global positioning system (GPS), Wi-Fi, and Bluetooth are used, but it is difficult to precisely check a position. However, the UWB (6 to 8 GHz and 500 MHz or higher bandwidth) has advantages of a wide frequency band, lower power communication, and high accuracy of about several tens of centimeters.

Position tracking technologies based on a GPS and mobile communication networks according to the related art respectively have error ranges of 5 to 50 m and 50 to 200 m, and in the case of the GPS, a problem may occur to catch signals transmitted from satellites in urban buildings.

In the case of the Wi-Fi, position tracking is performable with a low cost, but since a use frequency band is narrow, in a case in which there are many position tracking targets, a channel division limitation may occur. In addition, a mobile terminal may be disconnected from a fixed Wi-Fi access point (AP).

In the case of Bluetooth, it is possible to arrange a plurality of sensors at a low cost, however, since a communication latency is large, the Bluetooth is not suitable for tracking a position in a dynamic environment in real time.

Unlike Wi-Fi and Bluetooth, the UWB uses a wide frequency band and may transmit a large amount of information at a high transmission speed with low power.

Position tracking using the UWB technology has advantages of a low error rate of about 20 centimeters, a high transmission rate for an obstacle, and not being affected by another signal such as a Wi-Fi signal.

Figure 12B:
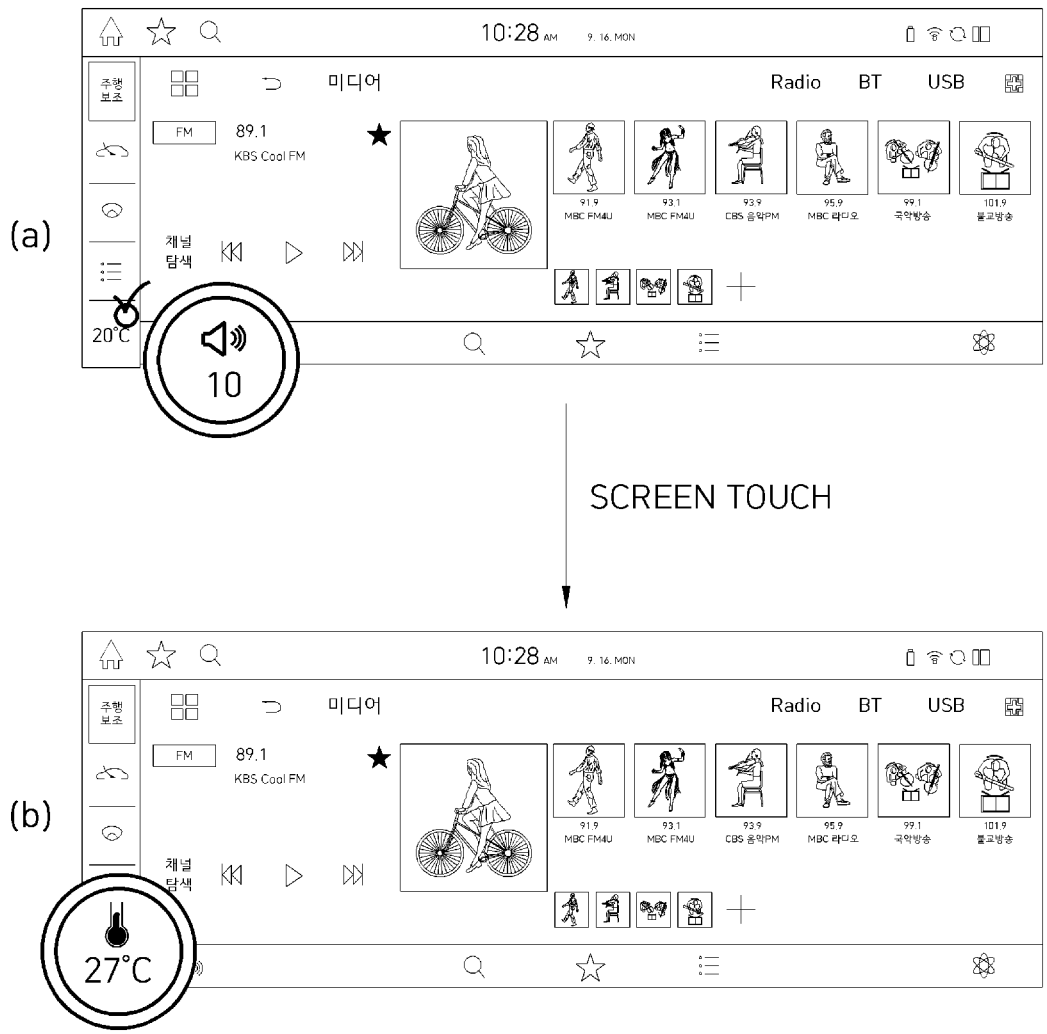

FIG. 12A and FIG. 12B are set of views illustrating a knob that is moved to a touch area according to another embodiment of the present invention.

According to another embodiment of the present invention, when a display such as an AVN/cluster is touched, a knob is automatically moved to an area in which the touch is input, and function control is performed at the corresponding area using the knob so that the ease of use is improved.

Referring to FIG. 12A, in the AVN, the knob is positioned under "play volume," and sound volume may be adjusted through a rotating/pressing operation of the knob.

As a user touches an air conditioning temperature in the AVN in FIG. 12A, the knob is automatically moved to under an area of the air conditioning temperature as illustrated in FIG. 12A.

The user may manipulate the knob moved under the area of the air conditioning temperature to set an air conditioning temperature.

As illustrated in FIG. 12B, in a case in which the knob is positioned on a display area and is more easily manipulated than manipulating by touch, the knob is moved in consideration of a user's touch input.

For example, as illustrated in FIG. 12B, when the knob performs a sound volume control function, in a case in which the user touches an air conditioning temperature setting area in the AVN, since temperature setting may be more easily performed by manipulating the knob than by touching (temperature setting through rotating action is more convenient than pressing a plurality of buttons), the knob is moved onto the air conditioning temperature setting area, and a set temperature is set by manipulating the knob as illustrated in FIG. 12B.

Figure 13:
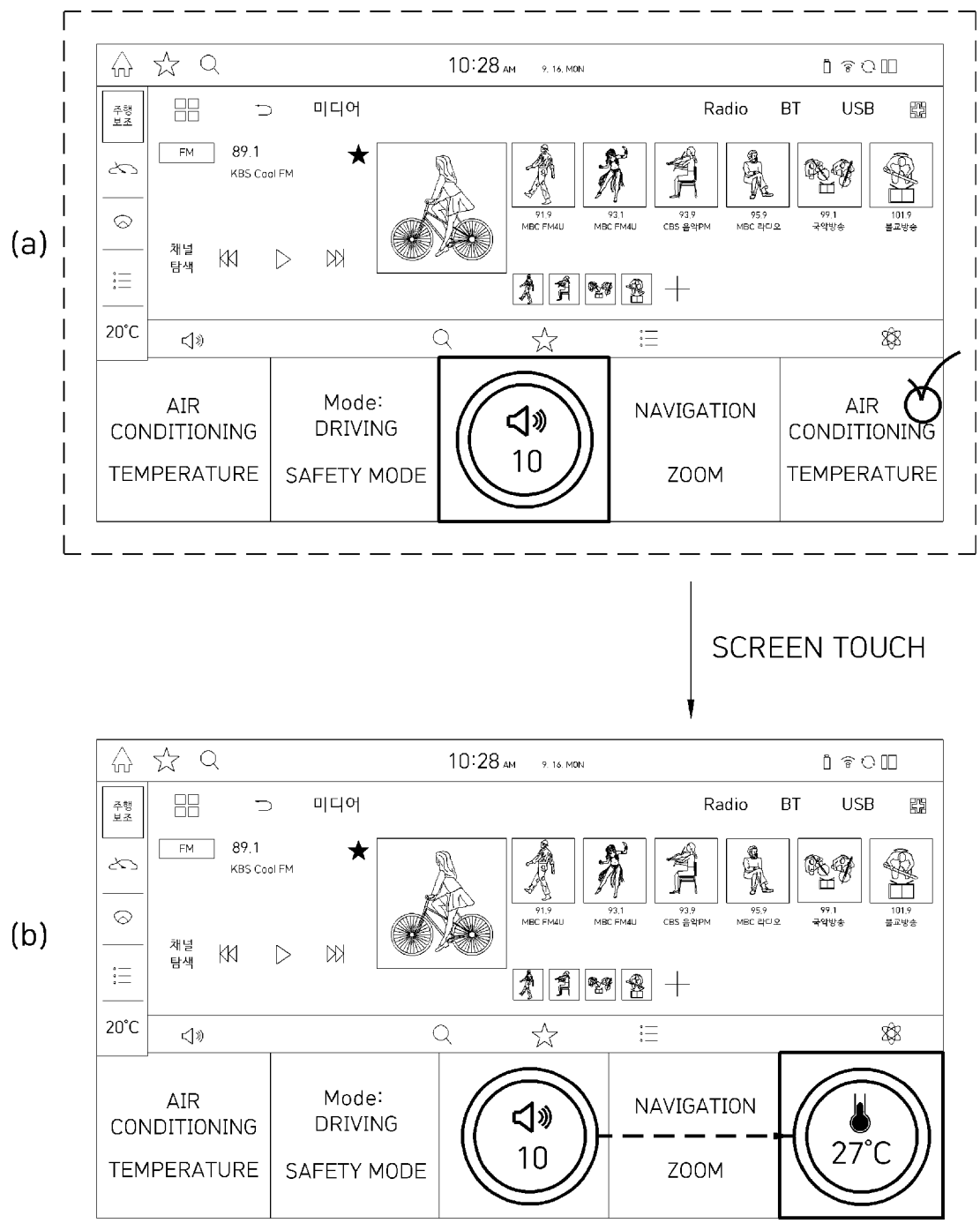
FIG. 13 is a set of views illustrating the knob that is moved to a touch area on a display according to another embodiment of the present invention.

FIG. 13 is a set of views illustrating the knob that is moved to a touch area on the display according to another embodiment of the present invention.

As illustrated in FIG. 13, in a case in which the knob is on the display area, the knob is positioned on a playback sound volume, and high or low sound volume is controlled by manipulating the knob.

In this case, as illustrated in FIG. 13, a touch input for an air conditioning temperature area is received in the display screen, a processor 130 moves the knob to the air conditioning temperature area which is the touched area, and a rotary action of the knob is performed on the air conditioning temperature area so that a setting temperature is set to an air conditioner.

Figure 14:
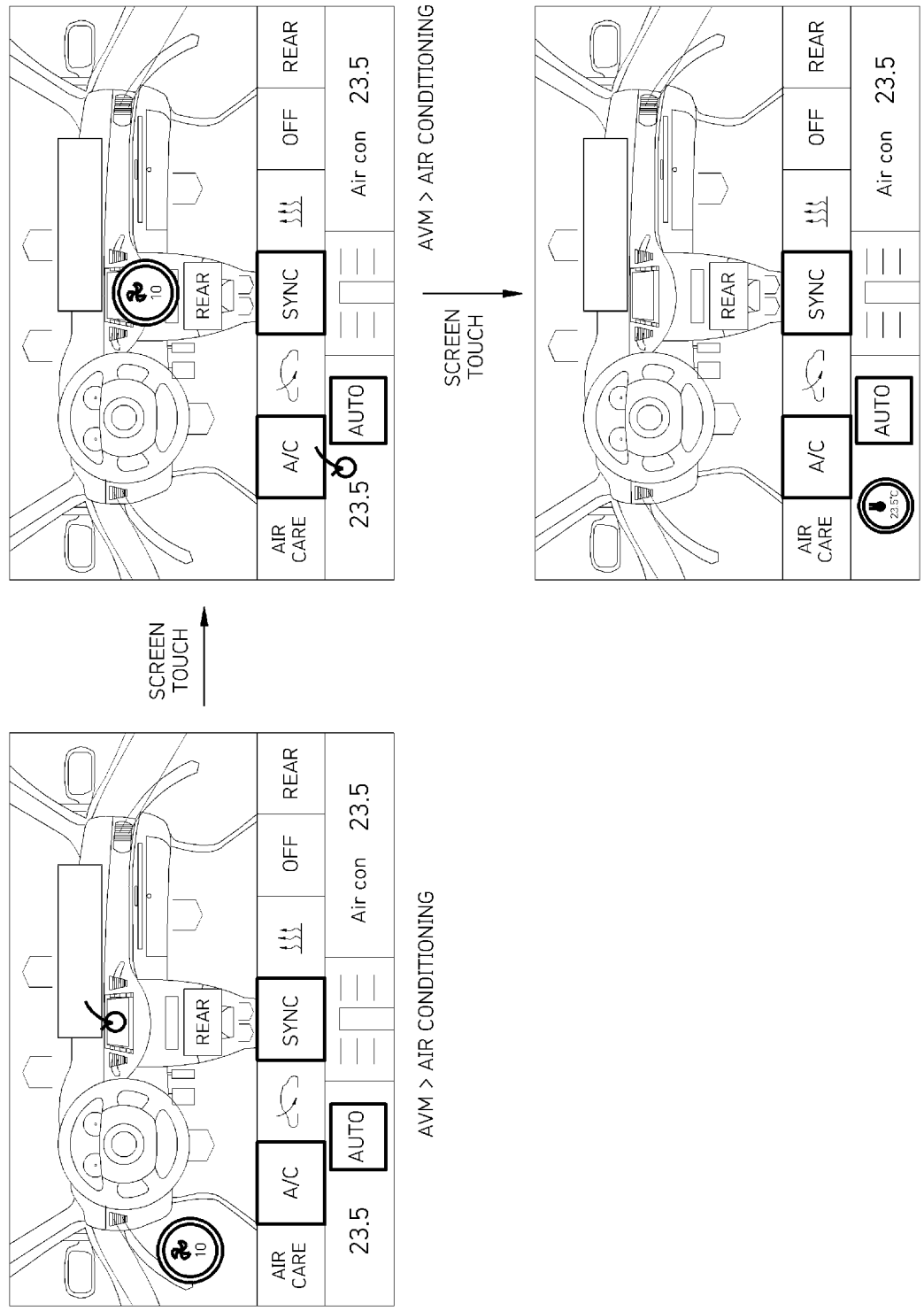
FIG. 14 is a view illustrating the knob that is moved to a touch area in a screen according to another embodiment of the present invention.

FIG. 14 is a view illustrating the knob that is moved to a touch area in a screen according to another embodiment of the present invention.

The display screen displays a vehicle seat arrangement image and a function menu provided to each seat.

When a touch for an area of which a function is performable is input in the display screen (for example, a driver seat air conditioning area as illustrated in FIG. 14), the knob is moved to the area to which a touch signal is input.

That is, in a case in which a screen for an air conditioning area is touched, the knob is moved to the corresponding screen to adjust an air quantity, and as a temperature setting area is touched in the corresponding screen, the knob is moved onto the temperature setting area so that a setting temperature may be adjusted by manipulating the knob.

Figure 15:
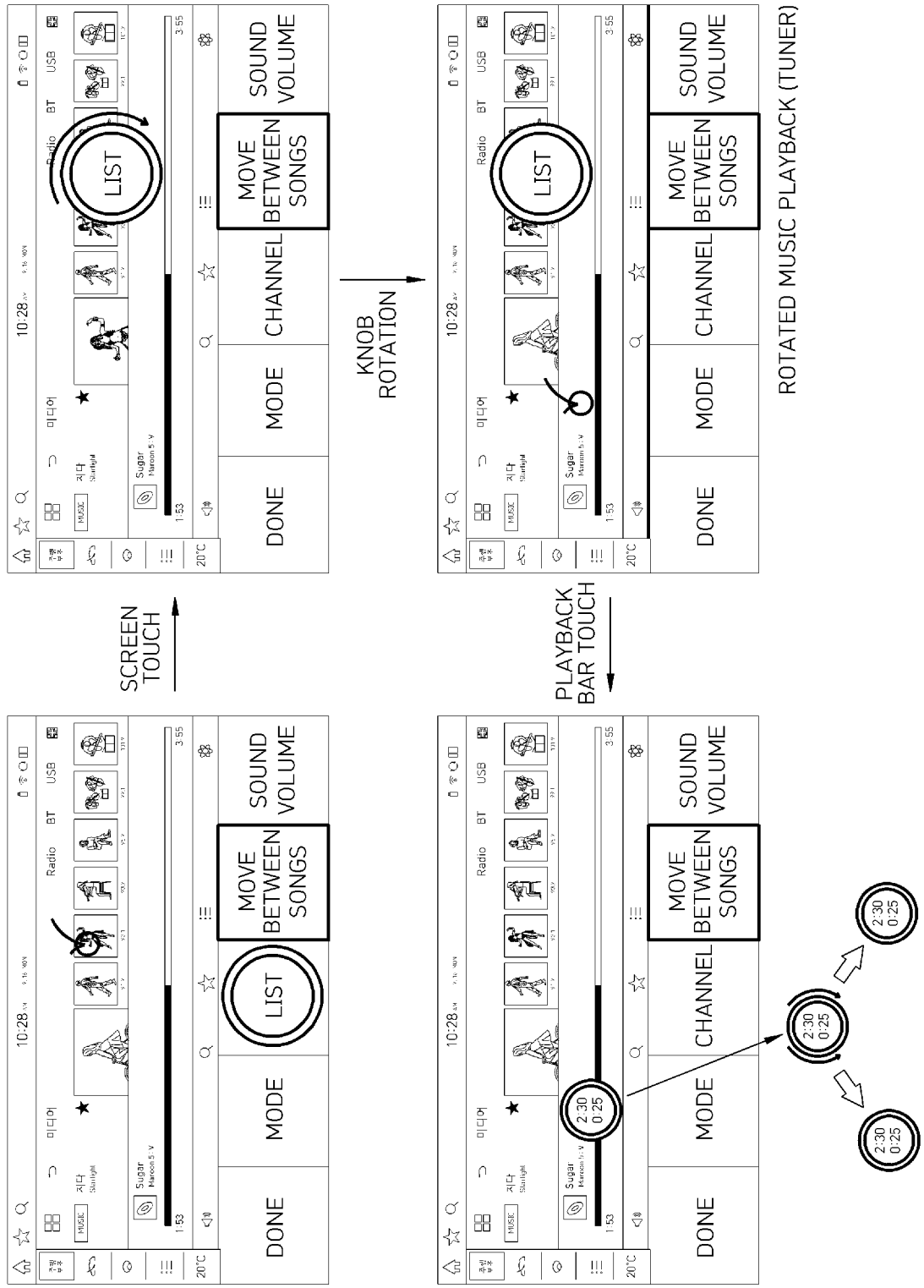
FIG. 15 is a view illustrating the control of a playback player according to another embodiment of the present invention.

FIG. 15 is a view illustrating the control of a playback player according to another embodiment of the present invention.

In the playback player, a music screen and a playback bar are distinguished, and the processor 130 controls movement of the knob for each touch signal input and sub-functions suitable for functions in consideration of operation of the knob (function control requiring sequential control).

That is, when the knob is moved according to a screen touch, a song selected when the knob is rotated is played, and even when the playback bar is touched to check a playback bar feedback screen, a knob button is disposed at a left side.

Figure 16:
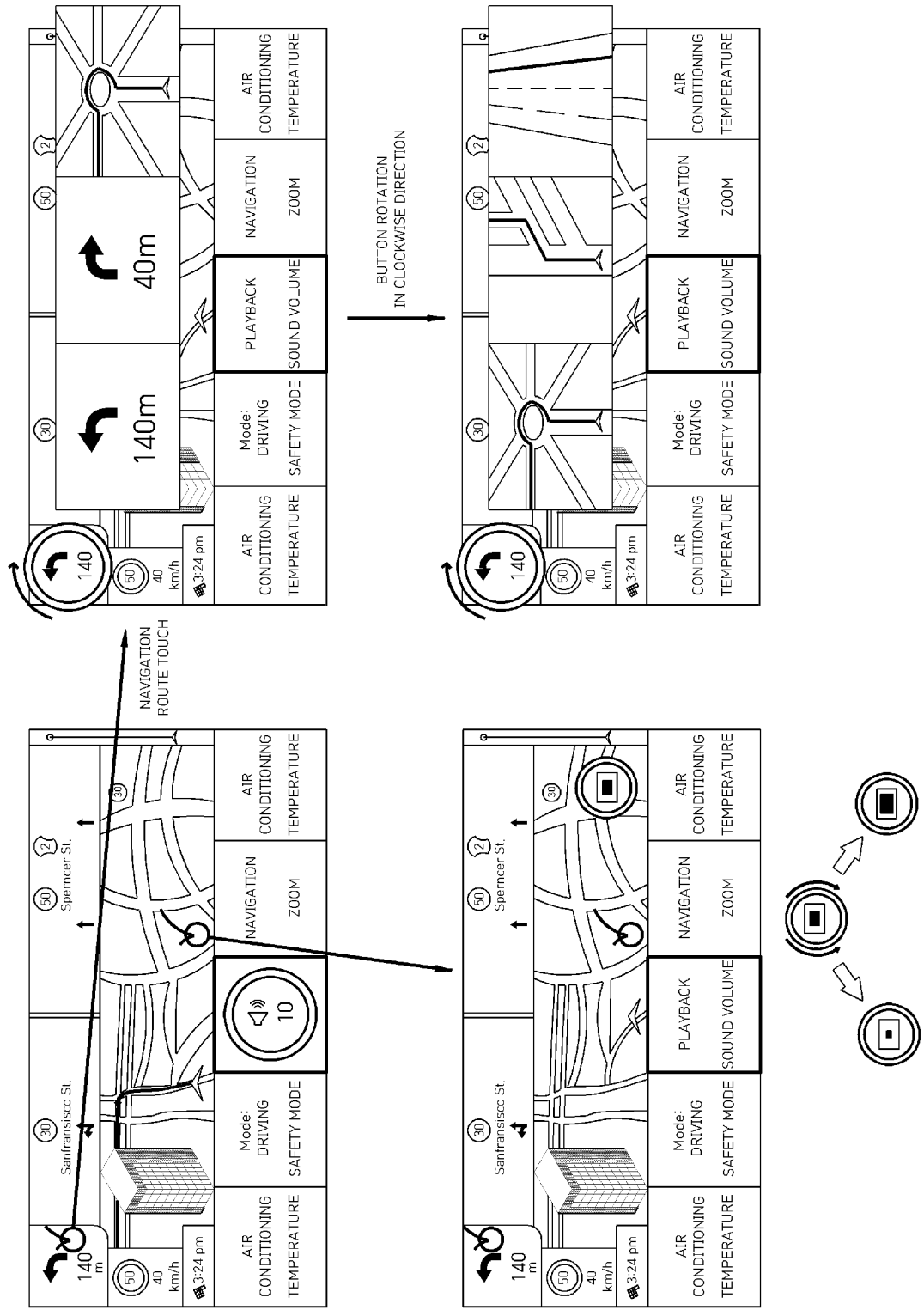
FIG. 16 is a view illustrating the control of a navigation screen according to another embodiment of the present invention.

FIG. 16 is a view illustrating the control of a navigation screen according to another embodiment of the present invention.

When a navigation screen is touched, a zoom-in/out is disposed beside the screen to check feedback of the screen. In this case, the zoom-in or zoom-out is performed by controlling the knob to be rotated in a clockwise/counter-clockwise direction.

In a case in which a route guidance area is touched in FIG. 16, when a rotary button (knob) is moved, a related screen is displayed at a right side.

When the rotary button (knob) is rotated, a following route is displayed, and road information related to the route is displayed.

Figure 17:
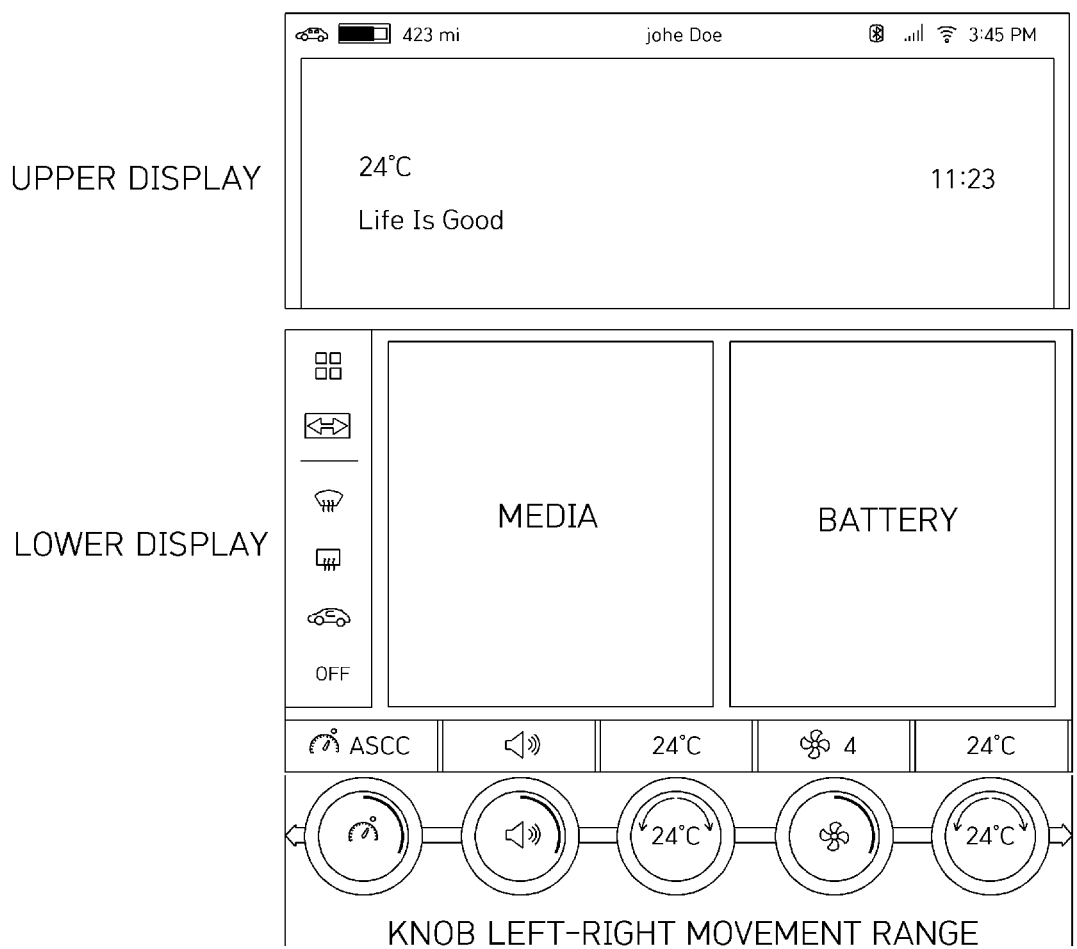
FIG. 17 is a view illustrating the arrangement of a knob according to still another embodiment of the present invention.

FIG. 17 is a view illustrating the arrangement of a knob according to still another embodiment of the present invention.

Temperature information, present playback music information, and present time information are displayed on an upper display, a menu, media, battery information, and the like are displayed on a lower display, and a knob is disposed under the display and moved within areas of advanced smart cruise control (ASCC), sound volume, driver seat temperature setting, and passenger seat temperature setting and performs control of a corresponding function in each area.

In this case, a menu of a setting area may be displayed according to a user setting or displayed to correspond to functions mainly performed according to a user history.

In addition, a menu corresponding to a recommended function may be displayed in consideration of a driver's driving status and an environmental status.

Figure 18:
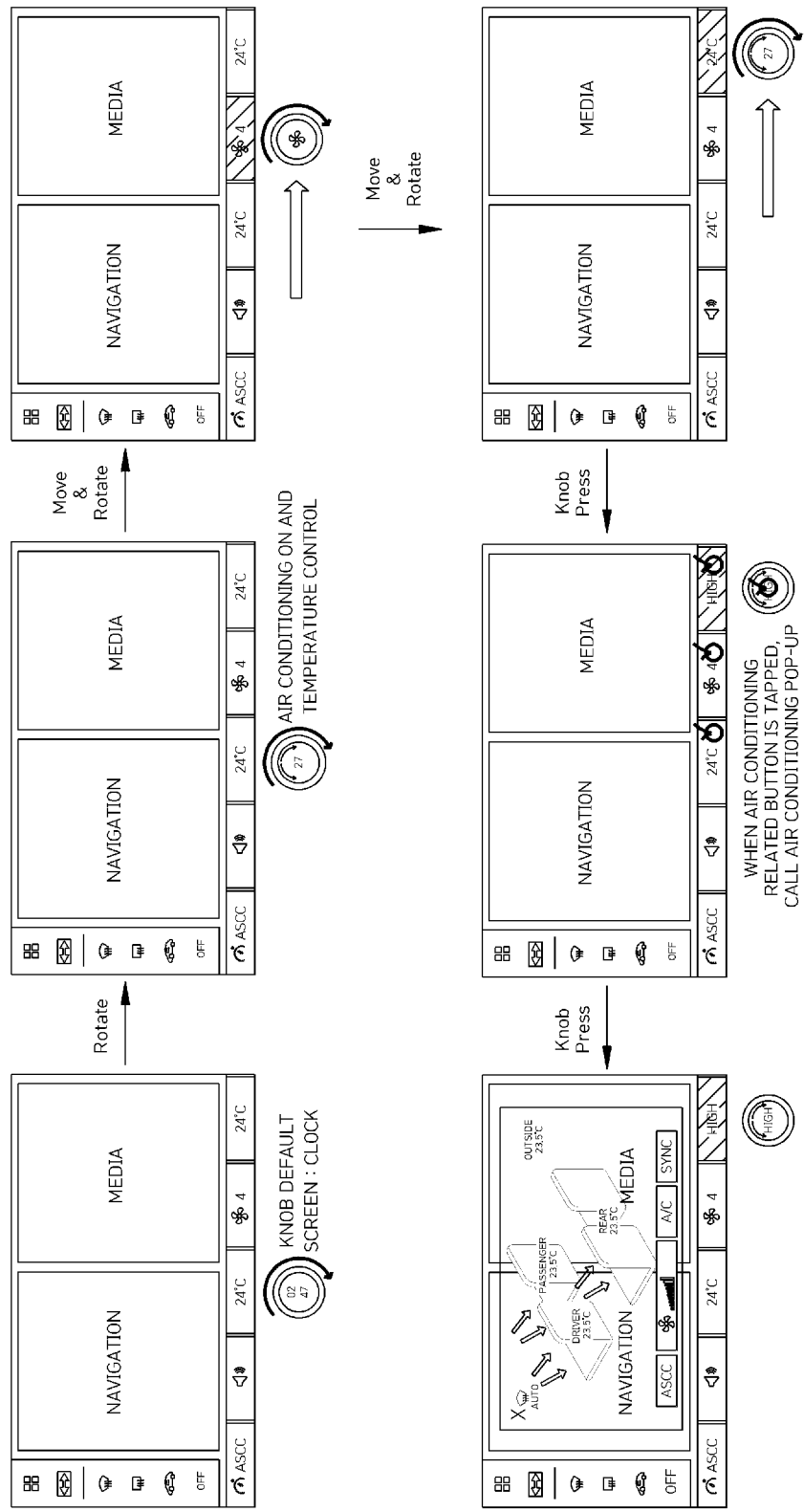
FIG. 18 is a view illustrating the control of an air using the knob disposed under a display according to still another embodiment of the present invention.

FIG. 18 is a view illustrating the control of an air conditioner using the knob disposed under the display according to still another embodiment of the present invention.

The knob disposed under a temperature setting area displays present time information on a default screen through an external surface of the knob.

As the knob is rotated, function control is performed for the temperature setting area in consideration of a present position of the knob to activate an air condition, and a setting temperature is adjusted according to a rotation direction of the knob.

As the knob is moved to an air quantity control area and a passenger seat temperature setting under the display, function control is performed according to each preset knob manipulation.

In this case, as the knob is moved, the function control is activatable, and as described above, the knob is also automatically movable to control the corresponding area according to a touch input for each function control area.

When a touch button related to air conditioning is tapped, an air conditioning pop-up is called, and in a pop-up screen, present temperature and preset temperature information is displayed for an area of each seat.

As described above, an area is selected by touching a setting target area (for example, a seat behind a driver), and a setting temperature of the selected area is adjustable by manipulating the knob.

Figure 19:
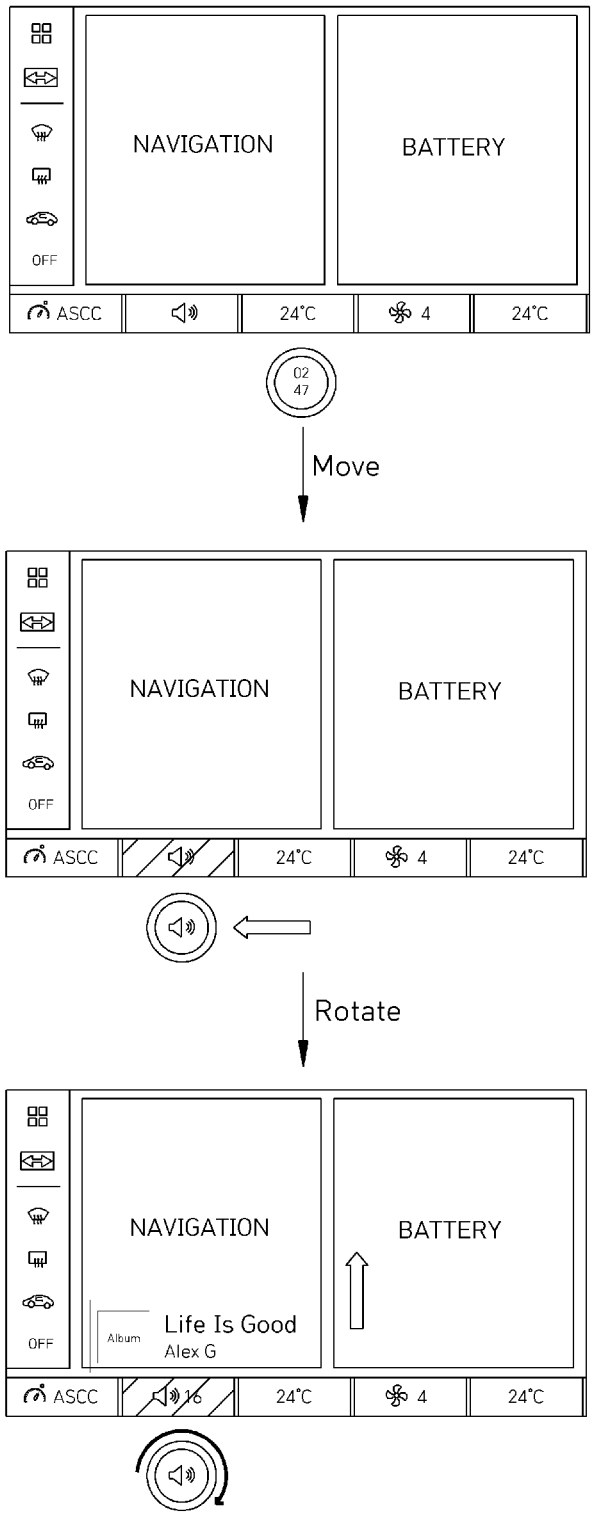
FIG. 19 is a view illustrating volume control using a knob disposed under the display according to still another embodiment of the present invention.

FIG. 19 is a view illustrating volume control using the knob disposed under the display according to still another embodiment of the present invention.

The knob disposed under a driver seat temperature setting area displays present time information.

In a case in which the knob is moved from under the driver seat temperature setting area to under a volume control area, volume information is displayed when a medium is being operated, a widget is displayed in a case in which the medium is being operated and there is no function, and system volume is adjusted in a case in which the medium is not operated.

Figure 20:
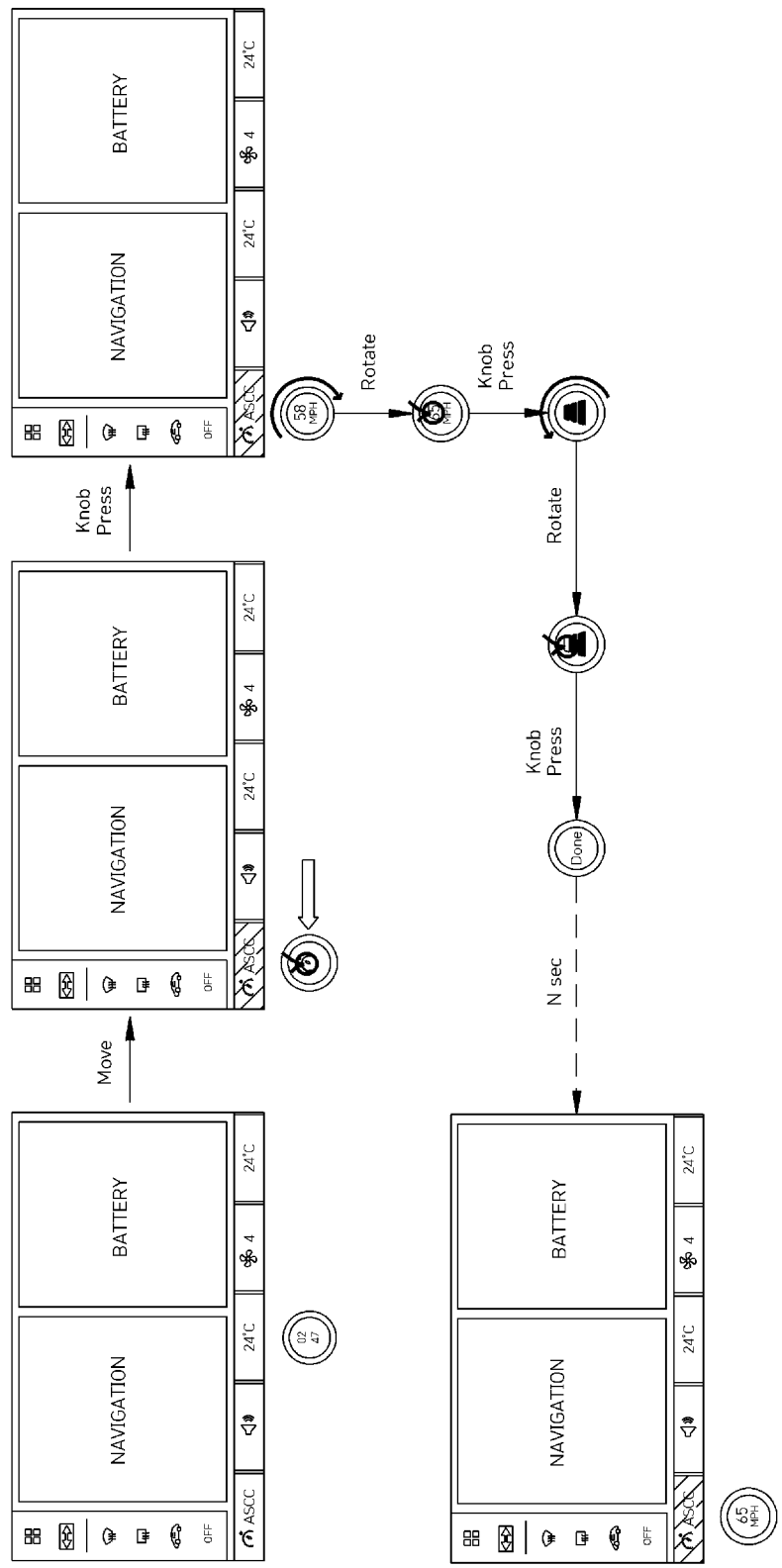
FIG. 20 is a view illustrating advanced smart cruise control (ASCC) using the knob disposed under the display according to still another embodiment of the present invention.

FIG. 20 is a view illustrating advanced smart cruise control (ASCC) using the knob disposed under the display according to still another embodiment of the present invention.

The knob disposed under the driver seat temperature setting area displays present time information on a default screen.

As the knob is moved to under an ASCC area, ASCC function control is activated, and present ASCC setting speed information is displayed on the knob.

As the user rotates the knob, ASCC setting speed information is displayed.

In a case in which the knob is pressed and rotated, and an action of pressing the knob is performed for a preset time (for example, several seconds), ASCC setting is changed.

Figure 21:
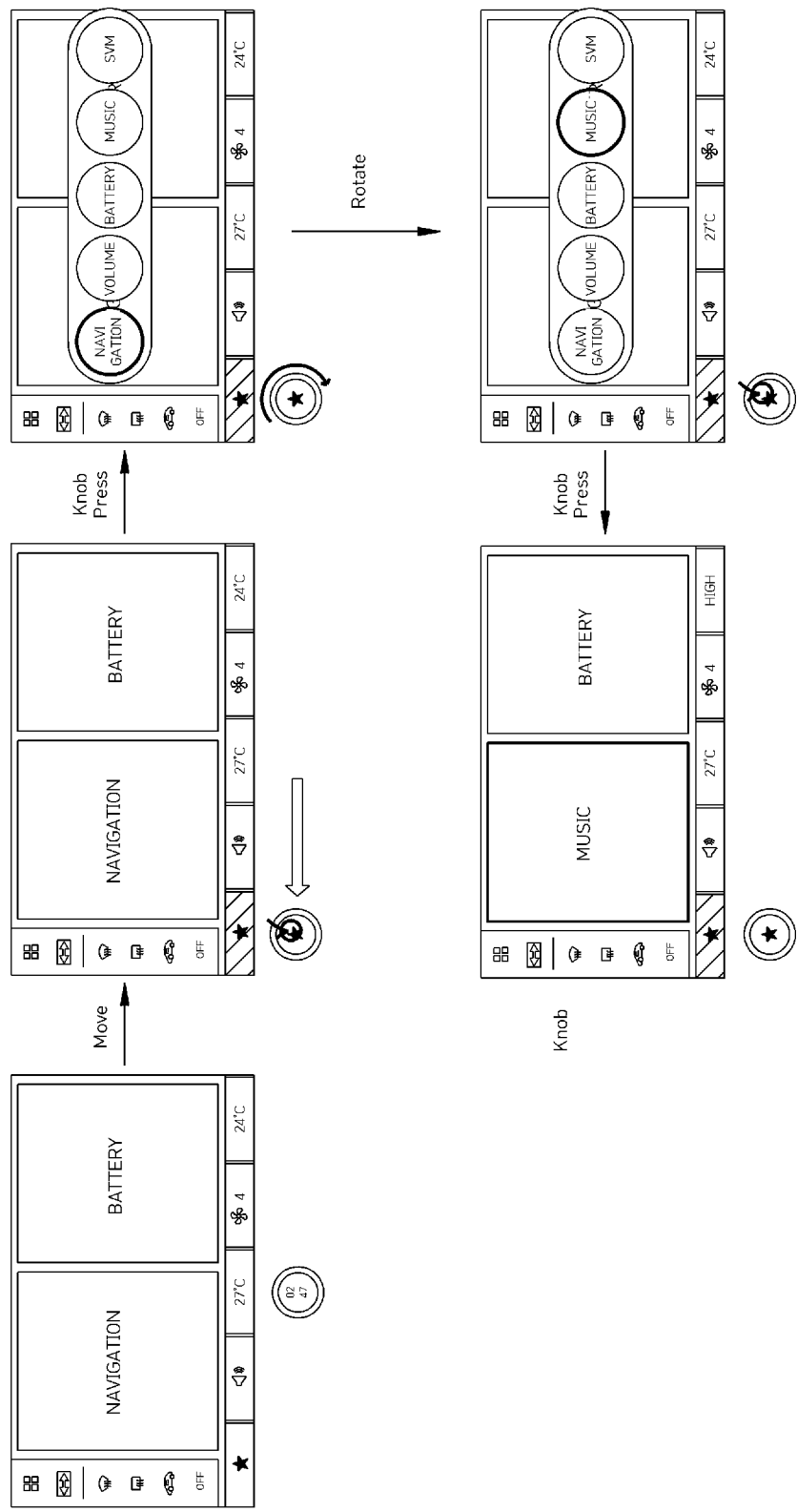
FIG. 21 is a view illustrating a user designated function using the knob disposed under the display according to still another embodiment of the present invention display.

FIG. 21 is a view illustrating a user designated function using the knob disposed under the display according to still another embodiment of the present invention display.

The knob disposed under the driver seat temperature setting area displays the present time information on a default screen.

When the knob is moved to under a favorite area, a menu, which is a user favorite menu (executed many times) is display, and as the knob is rotated, menu selection is performed.

When selection for a target menu (for example, music) is performed by pressing the knob, the selected menu (for example, music) is displayed on a display main screen.

Figure 22:
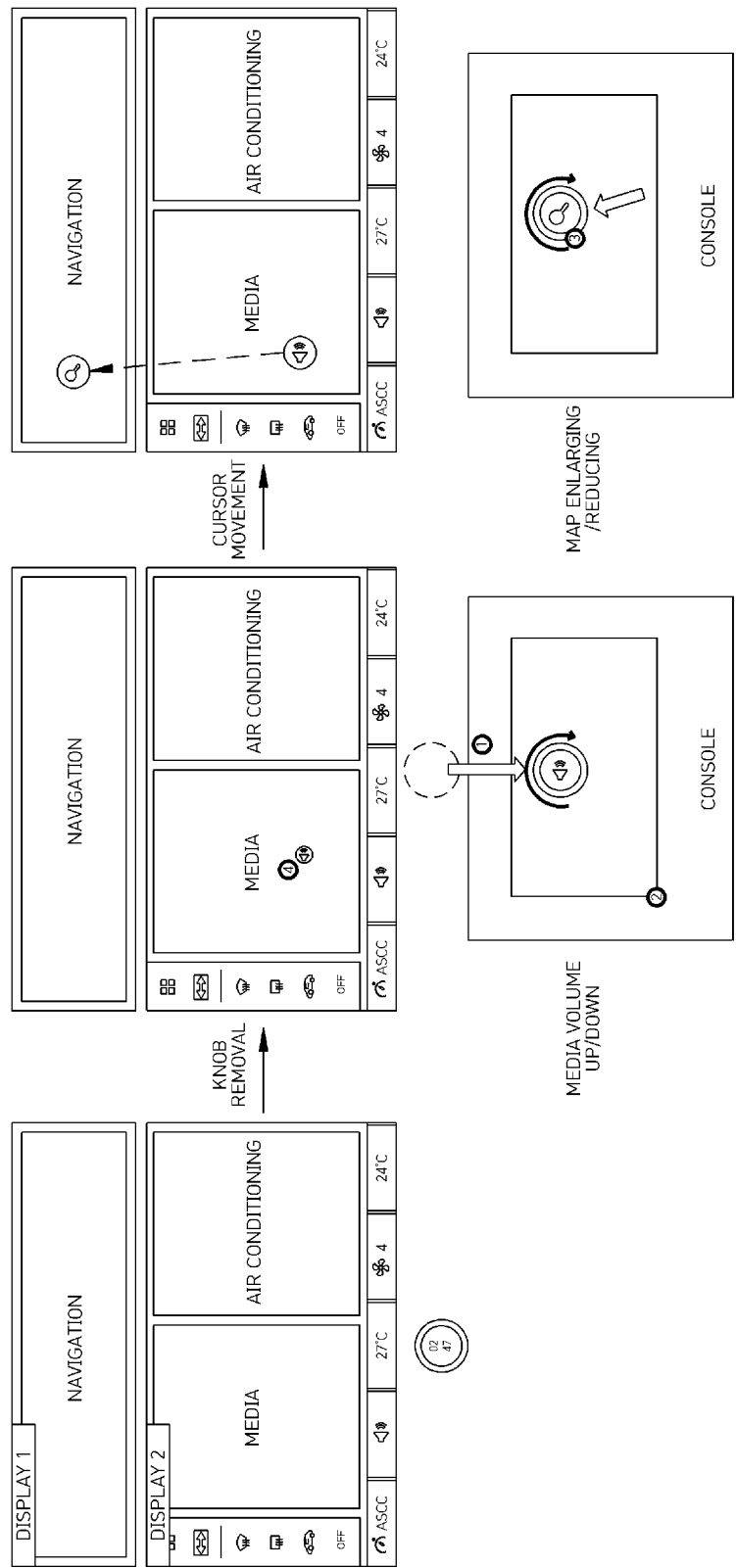
FIG. 22 is a view illustrating the display that is manipulated using the knob according to still another embodiment of the present invention.

FIG. 22 is a view illustrating the display that is manipulated using the knob according to still another embodiment of the present invention.

In a case in which the knob is placed in a specific area (for example, an arm rest), as the user manipulates the knob like a mouse, a manipulation for a multi-display is performed.

When the knob is attached to under the driver seat temperature setting area (the default screen displays the present time information), detached therefrom, and installed on a console, a mouse pad area is generated in the same proportion as a screen.

In a case in which the user uses the knob like the mouse so that a cursor is moved to a specific function, the cursor is changed to an icon (for example, sound volume) which is manipulatable using the knob in the corresponding function.

In a case in which the cursor is positioned for a specific function and the knob is rotated, the corresponding function is performed. For example, in the case of a navigation, a map is enlarged/reduced, and in the case of media volume, up/down control of sound volume is performed.

FIG. 23 is a view illustrating windows that are switched using the knob according to still another embodiment of the present invention.

The knob disposed on the console is used to switch and adjust functions (windows) between displays.

The knob controls the displays like a mouse function in a console area.

When media in a display screen is dragged to an area on which the navigation is displayed using the knob on the console, a "media" area and a "navigation" area are. Through this, a window switching function is performed.

Meanwhile, the method of controlling a display using a knob according to the embodiment of the present invention may be implemented in a computer system or recorded in a recording medium. The computer system may include at least one processor, a memory, a user input device, a data communication bus, a user output device, and a storage. The above-described components communicate with each other through the data communication bus.

The computer system may further include a network interface coupled to a network. The processor may be a central processing unit (CPU) or a semiconductor device configured to process commands stored in the memory and/or the storage.

The memory and the storage may include various types of volatile or non-volatile storage media. For example, the memory may include a read-only memory (ROM) and a random-access memory (RAM).

Accordingly, the method of controlling a display using a knob according to the embodiment of the present invention may be implemented as a computer executable method. When the method of controlling a display using a knob according to the embodiment of the present invention is performed in a computer apparatus, computer readable commands may perform the method of the controlling according to the present invention.

Meanwhile, the above-described method of controlling a display using a knob according to the present invention is implementable as computer readable codes in the recording medium. The computer readable recording medium includes any type of recording medium for storing data which may be decoded by the computer system. For example, the computer readable recording medium may include a ROM, a RAM, a magnetic tape, a magnetic disk, a flash memory, an optical data storage device, and the like. In addition, the computer readable recording medium may be distributed to computer systems connected through a computer communication network and stored and executed as codes readable in a distribution manner.

According to the present invention, a position of a display in a vehicle can be easily changed by manipulating a knob, and the position of the display can be provided in a user customized manner according to a position of the knob.

The user can use a detachable knob to manipulate the knob at any position in the vehicle so as to easily control the display.

Since the knob can be moved and perform a function in the vehicle, there are effects in that various functions can be performed with a minimum number of knobs, and the number of buttons can be reduced.

Effects of the present invention are not limited to the above-described effects, and the other effects which are not described will be clearly understood by those skilled in the art through following descriptions.

What is claimed is:

1. A display control system, comprising:
    a non-transitory memory storing a display control program in relation to a position of the input device comprising a knob; and
    a processor configured to execute the display control program to:
    receive position information of the knob;
    execute the display control program to change a display of content in a display based on the position information of the knob in relation to movement of the knob actuated by a user, positioned according to in-vehicle seat arrangement, actuating the knob;
    change location of the knob in the display based on the displayed content; and
    change the position of the input device comprising the knob, when the display is rotated,
    wherein the position of the knob is automatically changed when the display, which is in the landscape view mode, is rotated and changed to the portrait view mode, and
    wherein, as the knob is rotated from the landscape mode to the portrait mode, the knob at the position corresponding to the first menu in the view mode before the change is moved to the position corresponding to the first menu in the view mode after the change in consideration of the position information of the menu area displayed in the display.

2. The display control system according to claim 1, wherein the processor is further configured to determine a function menu selected on the display as the knob slides in a first axis direction, the knob being disposed on a crash pad or a bottom area of the display.

3. The display control system according to claim 2, wherein the processor is further configured to display a sub-function for a selected function as the knob is rotated in a second axis direction.

4. The display control system according to claim 2, wherein the processor is further configured to display a control screen for a selected function as the knob is rotated in a second axis direction.

5. The display control system according to claim 2, wherein the processor is further configured to display a screen for rotating a selected 3D object as the knob is rotated in a second axis direction.

6. The display control system according to claim 1, wherein the processor is further configured to check selection of the content displayed in the display and provide a focusing function for the content displayed in the display based on a change in the position information in an axial direction in which the knob is moved.

7. The display control system according to claim 1,
    wherein the non-transitory memory stores a program for controlling the position of the knob in relation to landscape and portrait view modes of the display, and
    wherein the processor is further configured to move the knob to a bottom area of the display in response to a conversion of the landscape and portrait view modes of the display.

8. The display control system according to claim 7, wherein the processor is further configured to determine an area for displaying a function menu selectable by the knob in response to the conversion of the landscape and portrait view modes.

9. The display control system according to claim 8, wherein the processor is further configured to:
    display the function menu in the bottom area of the display in response to the display being in the landscape view mode; and
    display the function menu in a central area within the display in response to the display being in the portrait view mode.

10. The display control system according to claim 7, wherein the processor is further configured to, in response to the knob being located at a position for selecting a first function menu before the conversion of the landscape and portrait view modes, determine that the knob is located at the position for selecting the first function menu after the conversion of the landscape and portrait view modes based on a range of movement of the knob after the conversion of the landscape and portrait view modes.

11. The display control system according to claim 1, wherein the physical position includes an elbow orientation of the user.

12. The display control system according to claim 1, wherein the physical position includes a viewing position of the user.

13. A display control method performed by a display control system, the display control method comprising:
    receiving position information of an input device comprising a knob;
    changing display of content by a display based on the position information of the knob by a user, positioned according to in-vehicle seat arrangement, actuating the knob;
    changing location of the knob on the display based on the displayed content: and
    changing the position of the input device comprising the knob, when the display is rotated,
    wherein the position of the knob is automatically changed when the display, which is in the landscape view mode, is rotated and changed to the portrait view mode, and
    wherein as the knob is rotated from the landscape mode to the portrait mode, the knob at the position corresponding to the first menu in the view mode before the change is moved to the position corresponding to the first menu in the view mode after the change in consideration of the position information of the menu area displayed in the display.

14. The display control method according to claim 13,
    wherein the knob is disposed on a crash pad or a bottom area of the display, and
    wherein the method further comprises:
    checking a change in position depending on sliding of the knob; and
    determining a function selected from functions displayed on the display in response to the change in position.

15. The display control method according to claim 13 wherein, in the changing of the display of the content, a sub-function or a control screen for a selected function is displayed as the knob is rotated.

16. The display control method according to claim 13, wherein, in the changing of the display of the content, a screen for rotating a selected 3D object is displayed in the display as the knob is rotated.

17. The display control method according to claim 13, wherein the knob comprises freedom of movement in at least two dimensions with respect to the display.

\* \* \* \* \*